United States Patent [19]
Palmer

[11] 4,454,613
[45] Jun. 19, 1984

[54] SELF-CONTAINED, COMPACT TOWABLE FACILITY HAVING MAXIMIZED BALANCED WATER STORAGE, DRAIN WATER COLLECTION AND WASTE WATER ISOLATION SYSTEMS

[76] Inventor: William A. Palmer, 6525 Green Valley Cir., No. 216, Culver City, Calif. 90230

[21] Appl. No.: 383,203

[22] Filed: May 28, 1982

Related U.S. Application Data

[63] Continuation-in-part of Ser. No. 129,180, Mar. 10, 1980, Pat. No. 4,332,040.

[51] Int. Cl.³ .............................................. B60R 15/00
[52] U.S. Cl. ........................................... 4/300; 4/317; 4/458; 4/625; 296/171
[58] Field of Search .......................... 4/300, 317-324, 4/449, 458, 329, 340-343, 353, 363, 552, 596-598, 602, 603, 625, 663-665; 296/171

[56] References Cited

U.S. PATENT DOCUMENTS

| | | | |
|---|---|---|---|
| 1,514,157 | 11/1924 | Harding | 4/458 X |
| 2,544,092 | 3/1951 | Karlson | 4/602 |
| 2,567,506 | 9/1951 | Bowman | 4/598 |
| 2,569,641 | 10/1951 | Metherell | 296/171 |
| 2,772,420 | 12/1956 | Carter | 4/458 X |
| 2,817,846 | 12/1957 | Stift | 4/664 |
| 3,123,393 | 3/1964 | Markwick | 4/458 X |
| 3,593,346 | 7/1971 | Katona | 4/317 X |
| 3,594,825 | 7/1971 | Reid | 4/663 |
| 3,668,710 | 6/1972 | Dowd | 4/597 |
| 3,992,727 | 11/1976 | Elkins | 4/317 |

*Primary Examiner*—Charles E. Phillips
*Attorney, Agent, or Firm*—Daniel J. Meaney, Jr.

[57] ABSTRACT

A self-contained, compact towable facility having sanitary components and electrical, water and gas distribution systems with minimum weight, optimum balance and a maximum volume of water adapted to be stored therein and including a frame having an axle and a tow bar adapted to be coupled to a towing vehicle, a multi-stage potable water storage and drain and waste water collection and isolation system which includes a potable water storage system, adapted to be filled by an exterior source, comprising tanks having a predetermined geometrical shape nad balance over the wheels of a single axle or tandem axle of the trailer or over substantially the midway point between front and rear wheels of a four-wheeled trailer and wherein the tanks are positioned to have the collective center of gravity thereof located at approximately the collective center of gravity of the drain and waste water collection and isolation system, a grey water collection system adapted to receive and collect drain water having a low impurity content wherein the tanks forming the grey water collection system are located in the center area thereof between the wheels, a black water isolation system having a predetermined volume and adapted to receive and isolate waste water having a high impurity content, the tanks forming the black water isolation system being attached to the frame and being positioned adjacent to the grey water collection tanks; and at least one grey water usage device which produces water having a low impurity content during the usage thereof and at least one black water usage device which produces waste water having a high impurity content, and means for transporting low impurity water from the grey water usage device to the grey water collection system and waste water having a high impurity content from the black water usage device to the black water isolation system is shown.

20 Claims, 22 Drawing Figures

SELF-CONTAINED, COMPACT TOWABLE FACILITY HAVING MAXIMIZED BALANCED WATER STORAGE, DRAIN WATER COLLECTION AND WASTE WATER ISOLATION SYSTEMS

This is a continuation-in-part of U.S. patent application Ser. No. 129,180 filed Mar. 10, 1980 now U.S. Pat. No. 4,332,040.

BACKGROUND OF INVENTION

1. Field of the Invention

This invention relates to a self-contained compact towable facility which is designed to have a water storage and drain and waste water collection and isolation system which is adapted to store and collect a maximum volume of water for the weight and size of the towable facility. The self-contained towable facility is intended to include necessary sanitation components, such as a water storage system which stores fresh potable water, electrical and/or gas water heater which heats, on demand, potable water, resulting in hot and cold water being available within the facility, a sink and a shower which are adapted to use the hot and cold water and during the usage thereof produces drain water having a low impurity content and a toilet, which may be of a recirculating and/or fresh water flushing type, which uses potable water to charge the same, and during usage thereof produces waste water having a high impurity content.

The self-contained towable facility is intended to be as compact as possible and still be able to contain required sanitation components and electrical, water and gas components while maintaining a balanced condition within the compact towable facility. The balanced condition is maintained at all times independent of the volume of potable water, drain water collected in the grey water collection system or the waste water collected in the black water isolation system. In a two-wheeled application, the moment of force applied on a tow bar, which is coupled to a towing vehicle, has a minimum variation over a selected limited loading range. In a four-wheeled application, the variation of total loading forces is evenly distributed over all four wheels which further minimizes variations in the moment of force applied on a tow bar. Thus, biased loading of the trailer either forward (fore) or rearward (aft) is minimized, resulting in a stabilized, compact, towable facility having minimum loading effects on the towing vehicle.

2. Description of the Prior Art

It is known in the art to have a towable facility which includes the sanitation facilities. One such known device is the shower facility described in U.S. Pat. No. 3,668,710. The shower facility described in U.S. Pat. No. 3,668,710 has a central utility section and two end shower sections wherein the utility section contains the equipment necessary to supply water and electrical power to the end shower sections. The source of supply water, the electrical power and the means for collecting and disposing of waste water produced from the shower facility is external to the facility.

The use of a water circulation system for a towable facility is described in U.S. Pat. No. 3,594,825. U.S. Pat. No. 3,594,825 discloses a system having a reservoir which is mounted at the ceiling of a trailer, a sink which is adapted to receive water from the reservoir, a shower which is adapted to receive waste water from the reservoir, a collection tank which is adapted to collect drain water from the sink and the shower and a toilet which is adapted to use the collected drain water as a source with the toilet using the drain water for flushing purposes and discharging the same as waste water into a holding tank.

It is also known in the art to include a trailer house, a toilet and a shower which are integral therewith such as that shown in U.S. Pat. No. 2,569,641. The primary disclosure of the trailer house in U.S. Pat. No. 2,569,641 is the physical arrangement of the interior of the trailer and a telescoping top section thereof and the inclusion of a toilet and shower as additional conveyance components.

It is also known in the art to have a plurality of different types of compact, towable trailers, either tent camping trailers, or trailers which have telescoping or collapsible features.

Typically, the known trailers are designed to accommodate a water storage system, a sink, a shower, a toilet and holding systems as a part thereof. In the known small compact trailers, such as a travel trailer known as the "SCAMP" brand camping trailer, such trailers are designed to provide the user with an interior floor plan which is primarily adapted for providing the user with sitting, eating and sleeping space within the interior of the trailer. Generally, small compact trailers do not have an extensive potable water storage, drain water collection, and waste water isolation system.

The trend of the present-day, small-scale trailers is to reduce the weight and the size thereof so that the same can be towed by the smaller lightweight motor vehicles. Under such design limitations, sanitary components and facilities are kept at a minimum to reduce the weight and size requirements thereof. Thus, as the trailers are reduced in size and weight, water storage systems and drain and waste water collection systems are kept at a minimum or completely eliminated from the design to maintain sitting, eating and sleeping space.

It is known in the art to provide access between a towing vehicle and a towed vehicle, such examples being trains, buses and other forms of vehicles used for public transportation.

Also, the use of a four-wheeled steerable trailer to provide improved tracking of the trailer to a towing vehicle is likewise known in the art. One such trailer is disclosed in an article entitled "Jayco to Produce New "Four-Wheeled" Trailer" which appeared in the February, 1981, issue of RV Dealer Magazine at pages 30 and 32.

SUMMARY OF THE INVENTION

In accordance with the present invention, the compact, self-contained towable facility includes sanitation components and electrical, water and gas distribution systems which are designed into and form part of a compact trailer having a minimum size and weight while maximizing the volume of water to be carried thereby. In the present invention, the self-contained towable facility is designed to include the necessary sanitation components in terms of potable water storage system, an electrical and/or gas heater to produce hot potable water, and a sink and shower adapted to use the hot and cold potable water. During use of the sink and shower, drain water having a low impurity content is produced, and this is referred to herein as "grey water". Also, a toilet, or other deivce, which is typically adapted to be charged from the potable water system, during use thereof produces waste water having a high impurity content, and this is referred to herein as "black water".

The compact, self-contained towable facility includes a grey water collection system which is adapted to collect the grey water from the sink and shower. A separate black water isolation system is adapted to cooperate with the toilet to isolate and store black water. A minimum size and weight of the trailer, with a maximum volume of water, is obtained by designing the potable water system, the grey water collection system and the black water isolation system such that as water is stored therein or passed therebetween, the center of gravity of each system and the effective center of gravity of the trailer remain substantially constant independent of the volume of water in each of the systems and the amount of water passed therebetween. In a two-wheeled application, nominal predetermined variations of towing moments of force are obtained by designing and placing various components such as the water heater, propane stove, propane gas tank, interior heater and other peripheral components in the trailer in such a way as to maintain the trailer center of gravity at slightly forward of the lateral centerline of the wheels forming the axle. This in combination with balanced potable water system, grey water collection system and black water isolation system results respectively in establishing and then minimizing the variation of loading force applied to the tow-bar when the same is coupled to a towing vehicle. Thus, the variations of loading force on the towing vehicle occur over a selected limited loading range.

In a four-wheeled application wherein the collection center of gravity of the potable water system, grey water collection system, and black water isolation system, and the effective center of gravity of the trailer remain substantially constant independent of the volume of water in each of the systems and the amount of water passed therebetween, the weight remains substantially evenly balanced over the four wheels independent of variations in total trailer load. The trailer remains in a horizontal pitch plane which is essentially parallel with the road without pitching up or down as water is added or subtracted. This also avoids additional four-wheel suspension adjustments to maintain the pitch plane horizontal to the road. Likewise, the four-wheeled application has a beneficial loading effect on the towing vehicle since it further minimizes the variations of loading forces on the towing vehicle through substantially even distribution of loading force variances over all four wheels.

Thus, by use of the compact, self-contained towable facility of the present invention, a small compact lightweight motor vehicle can tow the same. The compact, self-contained towable facility contains the necessary components and electrical, water and gas distribution systems to enable a user thereof to have modern sanitary conveniences, normally found in a home, at a remote location.

If desired, the trailer can accommodate a sleeping berth which does slightly increase the overall size of the trailer. However, the preferred embodiment of the concept and design philosophy is that sleeping quarters, sitting space, eating facilities and the like are to be located external from the trailer and the necessity of incorporating such components into the total facility is eliminated, thus saving overall weight and space.

In the prior art, sitting facilities, sleeping facilities and eating facilities form the basic and primary design of the trailer. If sanitation components in terms of a hot water system, shower or toilet are required, they are basically incorporated into the trailer floor plan as additional and secondary options by use of extra space or peripheral space which is devoted to a specified use such as a shower or toilet.

Specifically, prior art trailers rely primarily on the size and weight of the specific trailer structure for maintenance of a balanced loading condition, and the unbalancing effects produced during transfer, relocation and storage of fluid between usage devices in holding tanks are of minimal significance compared to the large trailer mass. However, in the present invention, the design concept is to reduce the trailer mass and size which then makes the unbalancing effects of the transfer, relocation and storage of fluid highly significant. Thus, the present invention overcomes the fluid transfer unbalancing effects by maintaining a balanced loading condition during transfer, relocation and storage of water in and between the potable water storage system, grey water collection system and black water isolation system.

The present invention accomplishes the above by use of a rigid frame having a central area, a rearward area at one end thereof and a forward area at the other end thereof. Each of the central area, rearward area and forward area are positioned about a towing centerline which is centrally located at approximately the lateral centerline of the wheels forming an axle in a two-wheeled application or at a location approximately midway between the lateral centerlines of the forward and rear wheels in a four-wheeled application. The rigid frame includes or is attached to a tow bar which is adapted to be coupled to a towing vehicle. A plurality of wheels is suspended from the frame and forms the axle. In a two-wheeled application, the axle is located slightly rearward of the overall center of gravity of the trailer with the central area of the frame located essentially between the wheels along the lateral centerline of the axle. The compact, self-contained towable facility includes a multi-stage potable water storage, grey water collection and black water isolation systems. The potable water storage system has a predetermined volume and is adapted to be filled from the exterior of the facility. In the preferred embodiment, the potable water storage system, in the form of two distinct tanks, is positioned with each tank located in a balanced relationship about the lateral centerline of the wheels forming the axle in a two-wheeled application or about the approximate midway point between the lateral centerline of the forward and rear wheels in a four-wheeled application. The potable water storage system is selected to have a geometrical shape which enables the center of gravity thereof to remain located at approximately the centerline of the axle in a two-wheeled application or at the approximate midway point between the lateral centerlines of the forward and rear wheels in a four-wheeled appliation, independent of the volume of potable water stored in the potable water storage system and the amount of the potable water withdrawn therefrom. The drain and waste water collection system comprises two sections, namely, the grey water collection system and black water isolation system.

The grey water collection system has a predetermined volume and is adapted to receive and collect drain water having a low impurity content. In the preferred embodiment, the grey water collection system is attached to the frame and is located in the central area thereof between the wheels, and under the potable water storage system. The grey water collection system is designed to have a geometrical shape and is positioned to enable the center of gravity thereof to remain slightly forward of the lateral centerline of the axle in a two-wheeled application and to remain slightly forward of the approximate midway point between the lateral centerlines of the forward and rear wheels in a four-wheeled application independent of the total volume in the grey water collection system and the amount of grey water deposited therein The black isolation system described herein is adapted to collect waste water having a high impurity content. The black water isolation system is attached to the frame and is located in a rearward area of the frame. The black water isolation system has a geometrical shape and is positioned to enable the center of gravity thereof to remain slightly rearward of the centerline of the axle in a two-wheeled application and to remain slightly rearward of the approximate midway point between the lateral centerline of the forward and rear wheels in a four-wheeled application independent of the total volume in the black water isolation system and the amount of black water deposited therein.

The self-contained trailer includes such components as a sink or shower, which receives potable water, and during usage thereof, produces drain water having a low impurity content, which is the grey water as defined herein. Likewise, the self-contained, compact towable facility inlcudes a toilet which, during use thereof, produces waste water having a high impurity content which is the black water as defined herein.

The compact, self-contained towable trailer of the present invention includes the necessary plumbing, piping and the like in order to mechanically connect the grey water usage and the black water usage device to a potable water storage system, a grey water usage device to grey water collection system, and a black water usage device to a black water isolation system.

The multi-stage potable water storage and drain and waste water collection and isolation systems' collective center of gravity will remain at substantially the same location relative to the centerline of the axle in a two-wheeled application and relative to the approximate midway point between the lateral centerline of the forward and rear wheels in a four-wheel application independent of the volume and the amount of fluid deposited or transported therebetween. This results in minimizing the variations of loading force on the tow bar when the same is coupled to a towing vehicle.

In facilities described in U.S. Pat. No. 3,668,710, an external source of potable water and a sewer system are required. In the water circulation system described in U.S. Pat. No. 3,594,825, the drain water is utilized as a source for the toilet. Further, only a single holding tank for toilet waste water is disclosed. In addition, the desired goal of having a minimun size and weight and maximum volume of water is not considered or disclosed to produce the desired minimization of variations of loading on the towing vehicle.

The other known trailers which include tent trailers, camping trailers and the like are not designed with the sanitation components as the primary elements to be included within the towable facility. On the contrary, in the known prior art trailers, the sanitation components are peripheral in nature or are added as features with the floor plan being designed around the more common elements of sitting areas, eating areas and sleeping areas.

One advantage of the present invention is that a compact, self-contained, towable trailer can be constructed using the teachings of this invention from known components to result in low cost, minimum trailer weight and maximum water volume storage and collection systems.

Yet another advantage of the present invention is that by use of known construction techniques, such as extruded aluminum tubing and the like to form the frame, the weight and size characteristics can be optimized such that the members forming the tanks for the potable water, the grey water collection system and the black water isolation system can be of standard size and weight and of a design such that as the amount of water is transferred, relocated or stored therein, the center of gravity of the water system remains at substantially the same location.

A yet further advantage of the present invention is that readily available and known components, such as instant water heaters, batteries, battery-charging systems and the like can be incorporated into the self-contained towable facility and positioned within the facility at locations and distances to maintain the center of gravity of the entire trailer slightly forward of the lateral centerline of the axle in a two-wheeled application and at approximately the midway point between the lateral centerline of the forward and rear wheels in a four-wheeled application.

A still further advantage of the present invention is that the variations and fluctuations of loading on a towing vehicle are maintained within a minimum range independent of the volume of water contained in any one or all of the potable water storage system, grey water collection system, and black water isolation system.

A still further advantage of the present invention is that the self-contained, compact towable facility of the present invention may be utilized in a stabilized four-wheeled trailer where improved tracking and tow vehicle loading of the same vehicle is required.

A still further advantage of the present invention is that the self-contained, compact towable facility of the present invention can be utilized with an over-the-towbar access wherein direct access to the towable facility from the towing vehicle can be afforded by means of a movable access platform structure.

BRIEF DESCRIPTION OF THE DRAWING

These and other objects of the invention, together with its various features and advantages, can be more easily understood from the following and more detailed description of the preferred embodiment taken in conjunction with the accompanying drawings wherein.

DESCRIPTION OF THE PREFERRED EMBODIMENT

Figure 1:
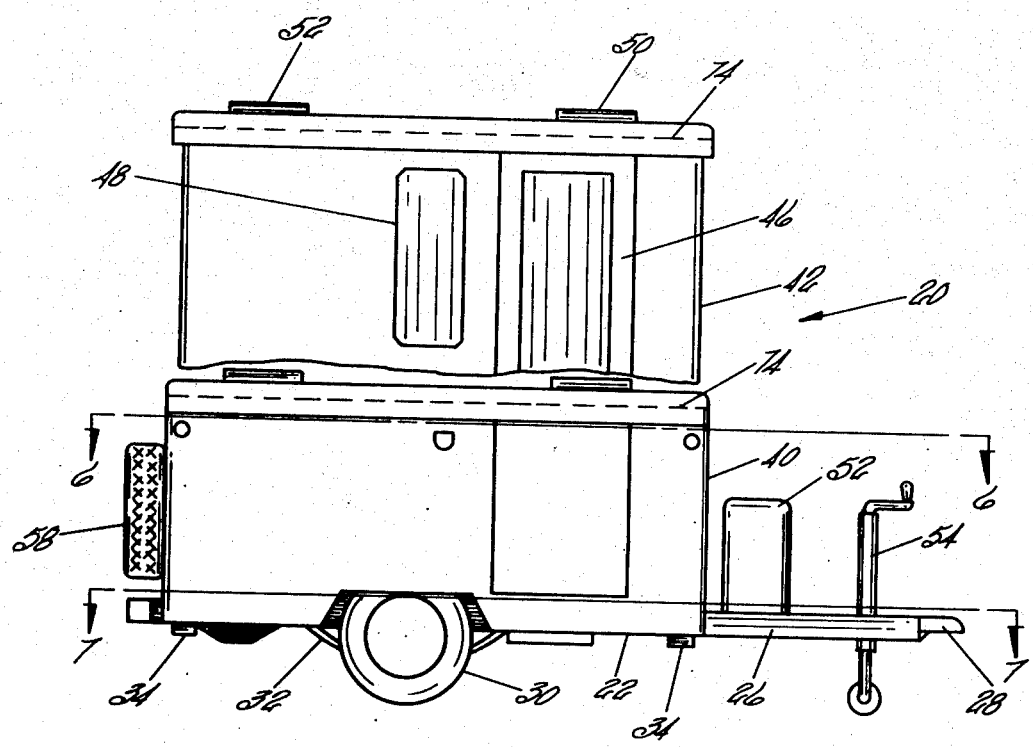
FIG. 1 is a side plan view of a self-contained, compact towable facility of the present invention having an exterior housing which is formed of a fixed bottom section and a telescoping top section.

FIG. 1 illustrates one embodiment of a compact self-contained towable facility generally indicated as 20. The towable facility 20 includes sanitation components and requisite electrical, water and gas distribution systems therefor. The towable facility 20 is adapted to be of minimum size and weight while maximizing the volume of water carried thereby.

Figure 7:
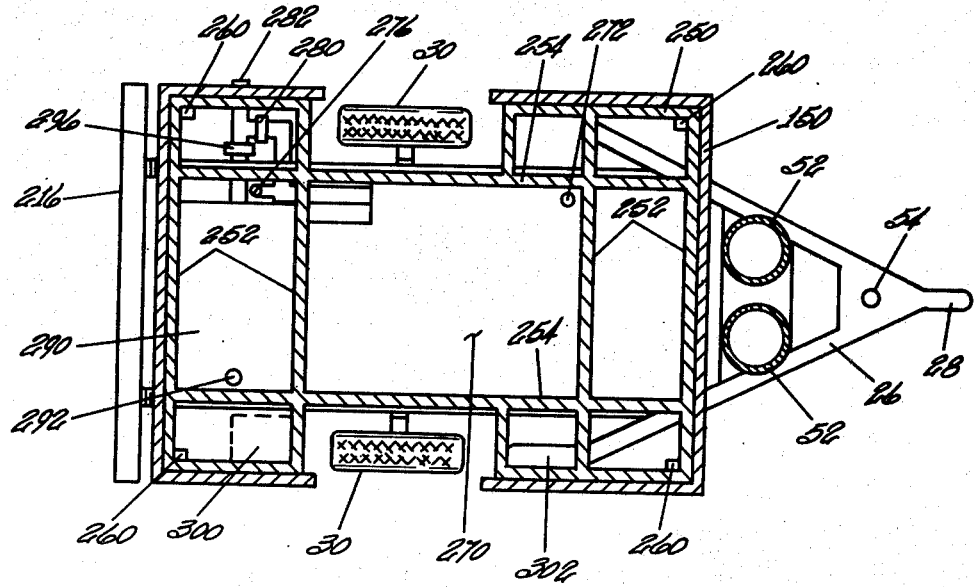
FIG. 7 is a top plan view of a rigid frame having a central area, a rearward area, and a forward area and adapted to have a pair of wheels rotatably connected thereto to define an axle and adapted to be used in the embodiments of FIGS. 1 and 6.

The towable facility 20 includes a rigid frame 22 having a central area, a rearward area at one end and a forward area at the other end. The details of the rigid frame for the embodiment of FIG. 1 are illustrated in FIG. 7. The central area, rearward area and forward area are positioned about the lateral centerline of the towable facility 20. The frame has a tow bar 26 extending from the front end thereof and the tow bar 26 is adapted to be coupled to a towing vehicle (not shown) through a standard female ball hitch connecting device 28.

The towable facility 20 has a plurality of wheels 30 suspended from the frame through a standard wheel suspension system 32. The wheels are mounted on axles and are positioned to be slightly rearward of the lateral centerline of the trailer and with the central area of the frame located between the wheels 30. Stabilizing jacks 34 are provided for stability when the towable facility 20 is on site and in use.

In the embodiment of FIG. 1, the towable facility is shown to be a collapsible-type unit. The towable facility 20 has a fixed bottom section 40 which includes a telescoping top section 42. The telescoping top section 42 is adapted to be raised into an extended position using an extension system which is well known in the art. When in an expanded position, the towable facility 20 is adapted to have a door 46 to provide entry therein and may include a window such as that illustrated as window 48. Vent and skylight units 50 and 52 may be provided for air ventilation and natural light within the towable facility 20.

In FIG. 1, one or more gas tanks 52 are provided for storing liquid propane or other liquid fuel to be used to supply the gas distribution system within the trailer. In the preferred embodiment, the gas tank 52 is located adjacent to the forward end of the trailer and located between the wheels 30 and the coupling member 28. A tongue jack 54 is provided to support the trailer when it is decoupled from a towing vehicle. In addition, the towable facility 20 includes a spare tire 58 which is located at the rearward area of the trailer. By positioning the various components about the lateral centerline, the moment of force which is applied on the tow bar 26 can be stabilized to minimize variations of the force exerted on the towing vehicle.

In addition to the exterior components of the towable facility described above, the towable facility 20 includes a multi-stage potable water storage and drain and waste water collection and isolation system. Typically, the major weight which must be accommodated by the towing facility 20 relates to the volume and weight of water carried thereby. During typical usage, it is envisioned that potable water is stored in a potable water storage system. As the potable water is used by the grey water usage devices and black water usage devices, a large volume of water is shifted around within the towable facility during usage thereof. In addition, fluid may be further added to the drain and waste water collection and isolation system from exterior sources. Such additional water will need to be positioned and stored within the trailer to maximize the volume of water while minimizing the loading effects thereof on the towing vehicle.

Figure 2:
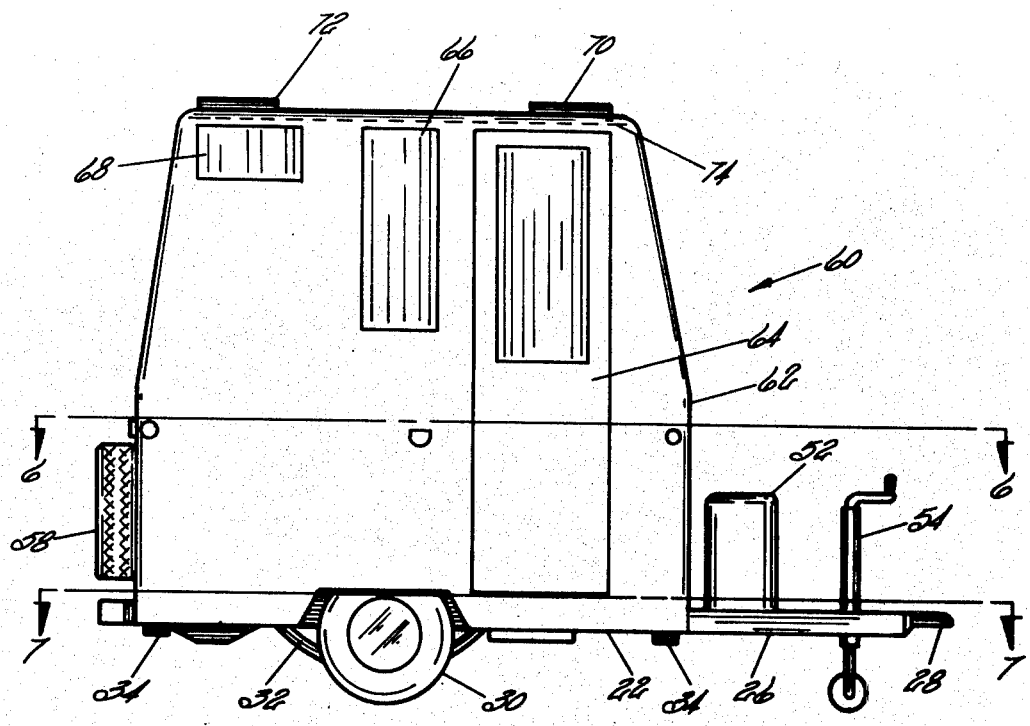
FIG. 2 is a side plan view of a self-contained, compact towable facility having a stationary exterior housing.
Figure 6:
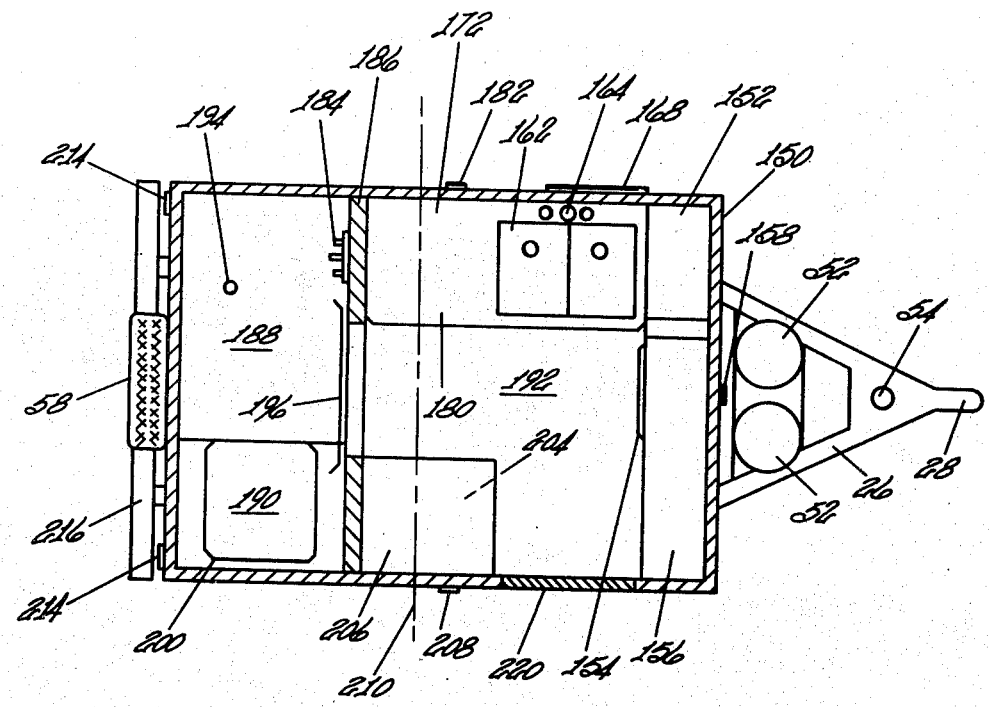
FIG. 6 is a top plan view of a self-contained, compact towable facility showing a floor plan locating the various components therein, adapted to be used in the self-contained, compact towable facility illustrated in FIG. 1.

FIG. 2 illustrates another embodiment of a towable facility. In the embodiment of FIG. 2, the rigid frame 22, the tow bar 26, the coupling member 28, the wheels 30, the wheel suspension system 32, jacks 34, the gas tank 52, the tongue jack 54 and spare tire 58 are of the same construction and design. However, the exterior housing of the trailer is rigid rather than having a fixed bottom section and telescoping top as that illustrated in FIG. 1. In the embodiment of FIG. 2, the towable facility, designated generally as 60, includes a rigid exterior housing 62, a doorway 64, a first window 66 and a second window 68. In addition, the rigid housing 62 includes vent and skylight units 70 and 72 to provide air ventilation and natural light therein. In section, the floor plan and frame assembly is the same as that for FIG. 1 and is illustrated in FIGS. 6 and 7 respectively.

In the embodiments of FIG. 1 and FIG. 2, the towing facility includes sanitation components and electrical, water and gas distribution systems in order to provide the necessities in terms of potable water which may be hot or cold, a shower, a toilet and cooking facilities. In the use of the towing device 20 in FIG. 1 and 60 in FIG. 2, it is envisioned that sleeping facilities would normally be located exterior to the trailer.

Typically, an expandable awning or other covering sheet can be attached across the top of either the telescoping section 42 of FIG. 1 or the rigid housing 62 of FIG. 2 shown by dashed line 74. During transportation, the awning is rolled up or stored against the housing. During use, the awning is extended to provide a covered area exterior to the trailer.

If desired, a screen porch or tent may be used to enclose the area either with or without the awning or covering sheet.

Figure 3:
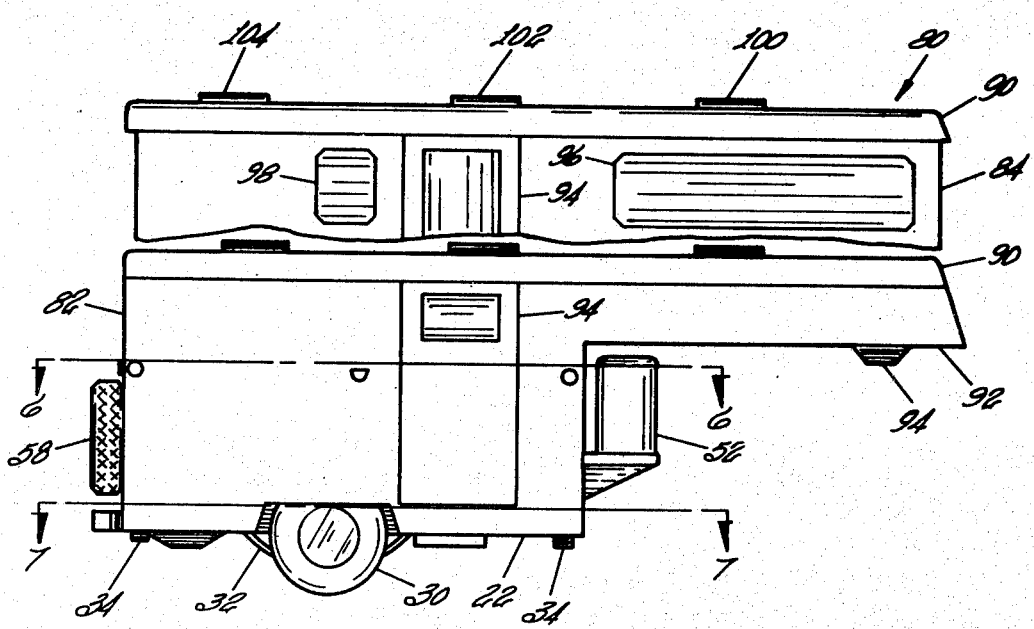
FIG. 3 is a side plan view of a self-contained, compact towable facility of the present invention having a fixed bottom section and a telescoping top section defining a housing extending forward principally as a means for removably attaching the trailer to a pivotable towing device and with a sleeping berth or storage space optionally located within the extended forward section.

FIG. 3 illustrates another embodiment of the towable facility of the present invention having an extended forward section which may be used for a sleeping berth or storage space. The rigid frame 22, wheels 30, wheel suspension system 32, jacks 34, gas tank 52 and spare tire 58 are positioned and located on the towable facility in substantially the same arrangement as that of the embodiments in FIGS. 1 and 2. However, the towing facility, generally designated as 80, has a fixed bottom section 82 and a telescoping top section 84 which has a roof member 90 located thereon. The fixed bottom section 82 and telescoping top section 84 define a housing within the trailer which includes a forward extending section 92. The towing bar equivalent to bar 26 in FIGS. 1 and 2 is integral with the forward extending section 92. Extending from the fixed bottom section 82 is a means for removably attaching the towable facility such as device 94 which is adapted for removably connecting the self-contained towable facility 80 to a towing vehicle. This arrangement is generally referred to as a "fifth wheel" connection.

The extending forward section 92 is adapted to be used as a sleeping berth or for storage space. In the embodiment of FIG. 3, the towable facility 80 includes a door 94 and windows 96 and 98. The top 90 includes top vents 100, 102 and 104 to provide ventilation for the trailer.

Figure 4:
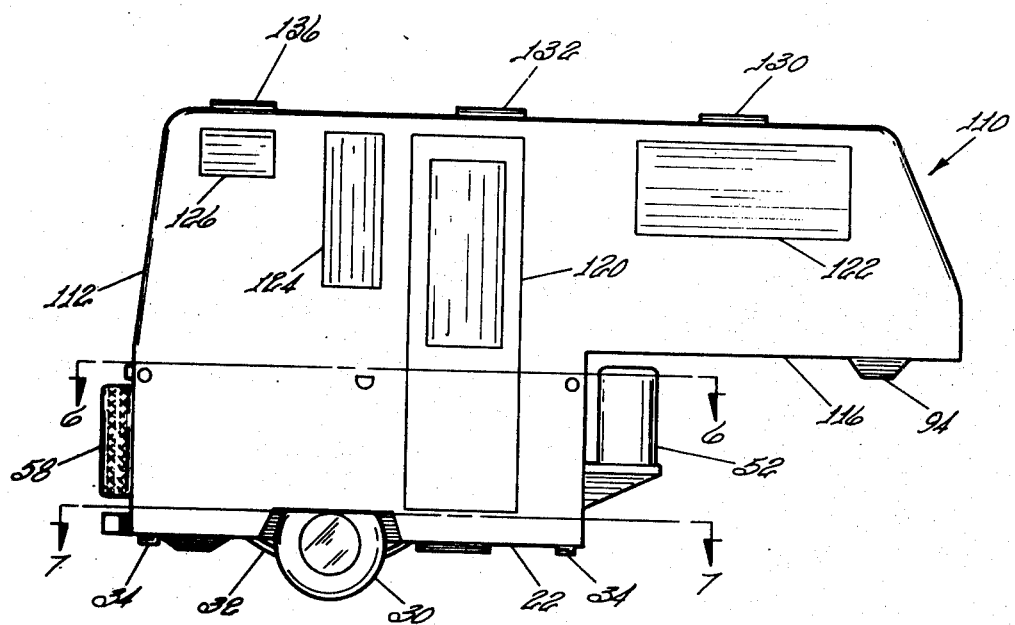
FIG. 4 is a side plan view of another embodiment of a self-contained, compact towable facility having a fixed exterior housing extending forward principally as a means for removably attaching the trailer to a pivotable towing device and with a sleeping berth or storage space optionally located within the extending forward section.

The embodiment of FIG. 4 shows a self-contained, compact towable facility 110 having a fixed exterior housing 112. The rigid frame 22, wheels 30, wheel suspension system 32, jacks 34, gas tank 52 and spare tire 58 may be of the same construction as that in the embodiments of FIGS. 1 to 3 inclusive. In the embodiment of FIG. 4, the towable facility 110 includes a fixed exterior housing 112 which includes an extending forward section 116 which is adapted to be used for either sleeping berth or storage space. The fixed exterior housing 112 includes a door 120, and a plurality of windows generally designated as 122, 124, and 126. In addition, vent and skylight units 130, 132 and 134 may be provided to provide adequate air ventilation and natural light for the towable facility.

Figure 5:
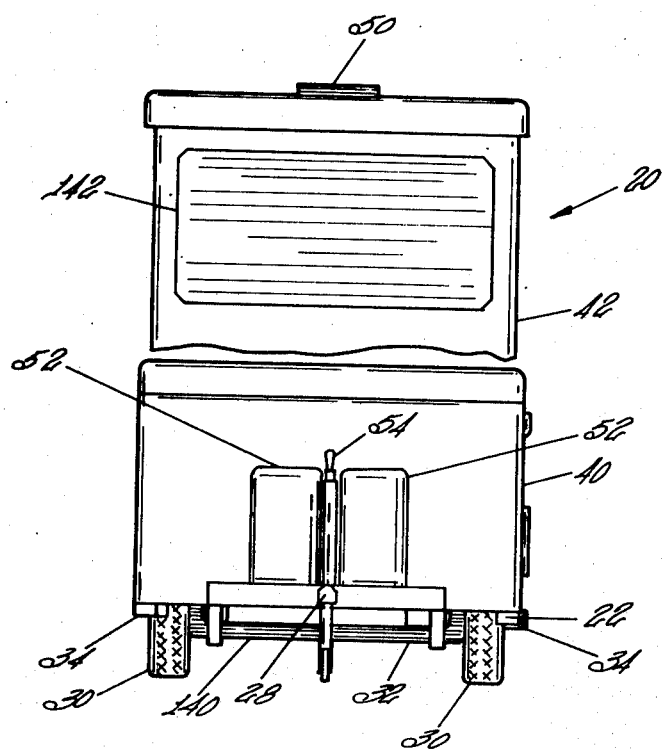
FIG. 5 is an end plan view of a self-contained, compact towable facility of FIG. 1.

FIG. 5 illustrates the front end view details of the towable facility 20 illustrated in FIG. 1. The wheels 30 are mounted on an axle 140. The axle 140 is mounted through a wheel suspension system 32 to the rigid frame 22. The fixed bottom section 40 is adapted to cooperate with the top telescoping section 42 and the open position thereof is likewise illustrated in FIG. 5. In the extended or open position, a window 142 is located at the end of the trailer to provide light and ventilation within the self-contained towing device 20.

FIG. 6 is a section taken along section lines 6—6 of FIGS. 1, 2, 3, 4 and 8. In the substance, FIG. 6 shows one floor plan of the interior of the self-contained towable facility illustrated in FIGS. 1 through 4 and 8, inclusive.

The gas tank 52, the tow bar 26, the coupling member 28, the tongue jack 54 and the spare tire 58 are shown therein. Although a number of the other elements within the interior are common, the following components may be added singularly or in combination in order to provide the desired features and capability of the self-contained towable facility. In its basic configuration, as will become apparent in connection with the discussions in connection with FIG. 12, the compact self-contained towable facility comprises the rigid frame, the wheels with the cooperating axle, suspension systems and a multi-stage potable water storage and drain and waste water collection and isolation system. In addition, the self-contained towable facility will contain the necessary sanitation components and electrical, water and gas distribution systems in order to provide the maximum components which may be used within the facility.

The towable facility sidewall is of appropriate construction in order to enable the embodiment of FIGS. 1 through 4 and 8, inclusive, to utilize the same. If the towable facility includes a telescoping top section, the side 150 is of a collapsible flexible material or a relatively rigid sidewall material to permit the top section to be telescoped up and down for usage and transportating respectively. The construction and use of the telescoping top section is well known in the art and need not be described herein in detail.

The front section of the towable facility includes a storage cabinet 152 which has been adapted for general storage within the facility. A heater 154, which may be an electric heater, catalytic or gas heater, is located within a counter storage section area 156. If desired, an electrical system can likewise be located in the storage area 156 and would include such items as a battery, battery charger, dual battery isolation system and the electrical supply system including an AC to DC power converter. In addition, one or more batteries can be located within the storage area 156 and such battery may be adapted to utilize with the dual battery isolation system so that one or both of the batteries can be charged by a towing vehicle charging system without discharging the associated battery. A heater vent 158 is provided for the heater 154, if required. Also, in the alternative, an ice-box may be located within the storage area 156.

The water distribution system may include a double sink 162 with associated faucets 164, and a water heater having a vent 168 may be located below the sink 162. The water heater could be an electric, gas and/or solar heated unit. The sink 162 is located within a counter 172 which includes a potable water supply tank 180 located thereunder. A water filled spout 182 is provided to fill the potable water tank 180 located under the counter 172. In addition, a shower fixture 184, which is operatively connected to the potable water system and the water heater, is shown. An interior wall 186 is provided to separate the shower area 188 and toilet area 190 from the cooking and general use area 192. A shower drain 194 is provided to permit drain water from the shower 184 to be drained into and collected by a grey water collection system. If desired, a shower curtain 196 may be privded to provide privacy to a user within the shower area 188 or the toilet area 190. A toilet 200 is located within the toilet area 190 and is operatively connected so that the waste water therefrom having a high impurity is collected and isolated in a black water collection system. A second potable water tank 204 is located under a counter section 206. An exterior water spout 208 is provided to fill the potable water tank 204. The connected potable water storage tanks 108 and 204 are located in an opposed spaced relationship to each other and positioned relative to the axle centerline 210, which axle centerline is located just slightly rearward of the lateral centerline of the self-contained towable facility. A door 220 provides access to the common usage area 192 from the exterior of the trailer.

Associated running lights 214 and a rear bumper 216 are provided for the trailer.

FIG. 7 shows in greater detail the relationship between the rigid frame which has the tow bar or lower main frame section 26 extending from the front end thereof which is adapted to be coupled to a towing vehicle through coupling member 28. The wheels 30 are joined to the frame through a wheel suspension system 32 as earlier discussed. The frame includes an upper frame section 250 which includes necessary cross-supports such as cross-members 252 and longitudinal support members such as members 254. The upper frame 250 through its associated cross-members 252 and support members 254 provide the rigid frame which supports the exterior housing 150. Stabilizing jacks shown as 260 are provided to stabilize the towable facility when the same is set up on site for use.

As illustrated in FIG. 7, the rigid frame provides the necessary support and separation for the multi-stage potable water storage and drain and waste water collection and isolation systems. The potable water storage tanks are located above the upper frame 250 within the interior of the self-contained towable facility as illustrated in FIG. 6. The potable water storage systems are positioned over the axle centerline 210. Just below the potable water storage tanks 180 and 204, illustrated in FIG. 6, is a grey water holding tank 270. The drain water, to be collected in the grey water holding tank 270 is adapted to have a predetermined storage volume and is adapted to receive and collect drain water having a low impurity content. Typically, the grey water is collected within the grey water collection system from grey water usage devices such as the sink 162 of FIG. 6 or the shower 184 of FIG. 6. The grey water holding tank 270 is adapted to be attached to the frame between the wheels 30 and under the potable water storage tanks 180 and 204 illustrated in FIG. 6. The grey water holding tank 270 is adapted to have a geometrical shape to enable the center of gravity thereof to remain slightly forward of the centerline of the axle, shown as dashed line 210 in FIG. 6, independent of the volume of grey water collected in the grey water collection system and, of course, the total amount of grey water actually deposited in the grey water holding tank 270. A grey water collection system drain valve 280 is provided to permit removal of grey water from within the tank 270 through outlet 282.

In addition, the frame 250 includes a black water isolation system having a black water holding tank 290. The black water holding tank 290 is adapted to have a predetermined volume and to receive and isolate waste water having a high impurity content from black water usage devices, such as a toilet illustrated as 200 in FIG. 6. Waste water from a toilet 200 enters the black water holding tank 290 through inlet 292. The black water isolation system is attached to the frame 250 and is located rearward of the grey water holding tank 270. The black water holding tank 290 has a geometrical shape to enable the center of gravity thereof to remain slightly rearward of the centerline of the axle as shown by a dashed 210 in FIG. 6. The center of gravity of the black water holding tank 290 is adapted to remain substantially in the same position independently of the volume of black water collected in the black water isolation system in the amount of black water actually deposited in the black water holding tank 290. Black water collected within the black water holding tank 290 may be removed by means of a black water valve 296 to permit the same to pass through outlet 282.

The frame 250 supports other components such as the bumper 216, a second battery 300 and a pull-down step 302.

From a utility standpoint, in one embodiment, the overall length of a self-contained towable facility of FIGS. 6 and 7, as measured from the end of the rear bumper to the tip of the tongue hitch and ball coupler, is one hundred forty-eight inches (148"). The main body length excluding spare tire, rear bumper, A-frame section 26, fifth wheel supported by the extending forward sectioni or exterior hardware is approximately ninety-six inches (96"). If an extending forward section is added, as shown in FIG. 4, the overall length is increased to approximately one hundred eighty-three inches (183"). In the embodiment illustrated in FIGS. 6 and 7, the body width, minus the exterior side hardware, would be approximately sixty-eight inches (68").

Depending on the configuration of the housing, namely whether the towable facility has a fixed bottom section and a telescoping top section or has a fixed housing, the collapsed total height of a telescoping section above ground can vary between fifty-five inches (55") to seventy-eight inches (78") when in the collapsed position and one hundred two inches (102") when in an erected condition with a telescoping top in the open position or in a fixed exterior housing configuration. The interior head room within the trailer can be in the order of seventy-two inches (72") to eighty inches (80") the desired height.

Using standard construction techniques, typical steel for the frame and other standard available components, the overall dry weight of the trailer is approximately one thousand forty (1,040) pounds.

In such a configuration, the weight could vary plus five percent (5%) or minus ten percent (10%). The tongue force wherein the tongue force is the tow bar force applied to the standard male ball hitch connecting device attached to the towing vehicle from the standard female ball hitch connecting device 28 for an unloaded towable facility can be selected to be between approximately one hundred seventy-six (176) pounds of force and about one hundred thirty-five (135) pounds of force plus five percent (5%) or minus fifteen percent (15%).

In a typical configuration where the towable facility is loaded with water and necessary supplies, the weight is increased approximately four hundred ten (410) pounds, making the estimated loaded weight of the towable facility to be approximately one thousand four hundred fifty (1,450) pounds. This results in an increase of force on the tongue of approximately forty (40) pounds making the force on the towing vehicle to be between approximately two hundred fifteen (215) pounds and about one hundred seventy-five (175) pounds plus five percent (5%) or minus fifteen percent (15%). The gross weight capability of the self-contained towable facility would be approximately two thousand two hunderd (2,200) pounds. The maximum roll imbalance over either wheel under all loading conditions would be approximately thirty-five (35) pounds plus five percent (5%) or minus fifteen percent (15%).

Figure 8:
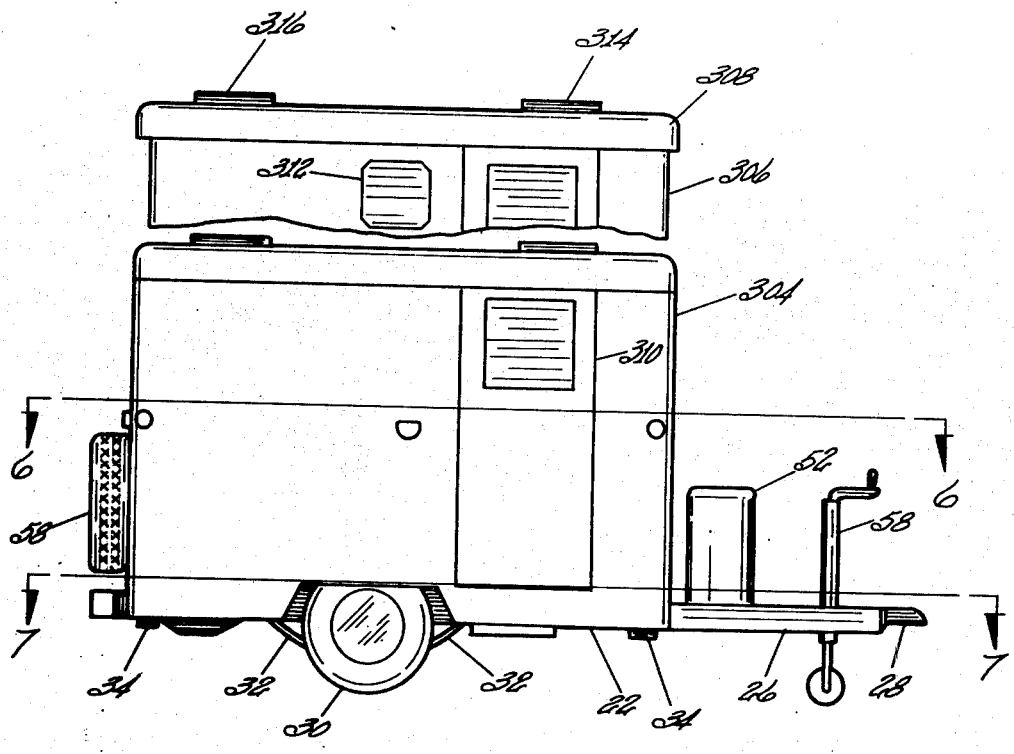
FIG. 8 is a side plan view of yet another embodiment of a self-contained, compact towable facility having a fixed bottom section and a telescoping top section.

FIG. 8 shows another embodiment fo the self-contained towable facility of FIG. 1.

In the embodiment of FIG. 8, the main frame 22, the lower frame section or tongue section 26, the coupling member 28, the wheels 30, the wheel suspension system 32, the self-contained jacks 34, the gas tanks 52, the tongue jack 54 and spare tire 58 are substantially of the same construction and design. The self-contained towable facility illustrated in FIG. 8 has a fixed bottom section 304 and a telescoping top section 306. A roof 308 is provided for the telescoping top section. A door 310 provides access to the interior of the self-contained towable facility. When the telescoping top section 306 is in open condition, a window 312 is provided within the top section 306. Air ventilation and skylights 314 and 316 are provided for air ventilation and natural light to the interior of the self-contained towable facility.

Figure 9:
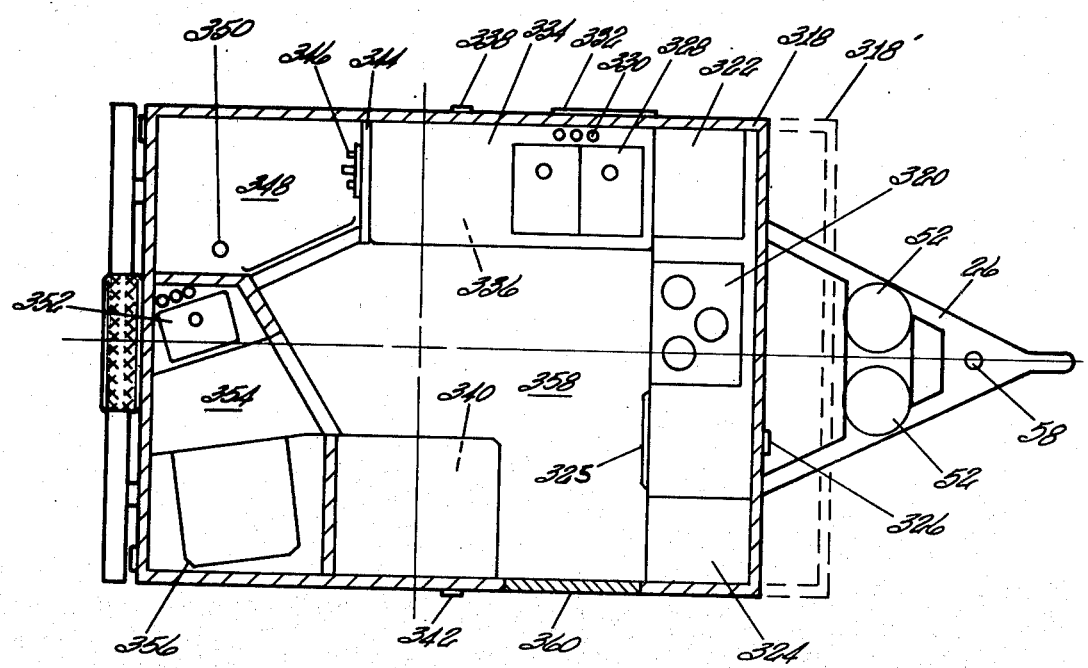
FIG. 9 is a top plan showing the interior arrangement and floor plan of yet another embodiment of a self-contained, compact towable facility illustrated in FIG. 1.

FIG. 9 illustrates a floor plan adapted to be used as a slightly larger self-contained towable facility similar in side plan to FIGS. 1 through 4 and 8, but slightly larger in scale. In FIG. 9, the lower portion of the frame 26, the gas tanks 52 and the tongue jack 54 are designated showing that the construction thereof is identical to the earlier desribed embodiments. The fixed bottom section 304 illustrated in FIG. 8 and 40 illustrated in FIG. 1 has a fixed side wall designated as 318 in FIG. 9. The side wall proivides a means for enclosing the self-contained towable facility. In the event that the self-contained towable facility has an extending front section as in FIG. 10, the area shown by dashed lines and designated as 318' defines the exterior dimensions of the housing. At the forward end of the trailer, a storage area 322 is provided for general storage of a trailer. Likewise, a second storage area 324 is provided which would include the same components in terms of a battery, dual battery isolation system, DC to AC converter and other components which define an electrical system. A heater 325 can be installed under the storage area 324 and, if necessary, would include a vent 326 extending to the exterior of the sidewall 318. A cooking stove 320, which may be a gas or electric unit, can be included in the counter of the storage area 324. A sink 328 having faucets 330 is likewise located in the forward portion of the trailer. A water heater is located below the sink and has an external vent shown as 332. A counter 334 supports the sink 328 and its associated faucets 330 and includes space thereunder for a potable water storage tank shown as 336. A filling spout 338 is provided to enable the filling of the potable water tank 336 from an external supply of fresh water. In the rear portion of the facility, a shower area 348 is illustrated which includes a separate internal wall 344 which holds thereon the faucets 346. The drain water from the shower is collected by drain 350.

In the embodiment of FIG. 9, there is sufficient square area to provide a combination lavatory-toilet area designated as area 354. Area 354 would include a sink 352 and a toilet 356.

A second potable storage tank 340 is provided in the interior of the self-contained towable facility, which potable storage tank 340 is located in spaced opposed alignment with the potable water tank 336, both of which are located in approximately the centerline of the axis of the facility. A filling spout 342 is provided to enable the filling of the potable storage tank 340. A doorway 360 is provided to permit access to the interior area 358 of the self-contained towable facility.

Figure 10:
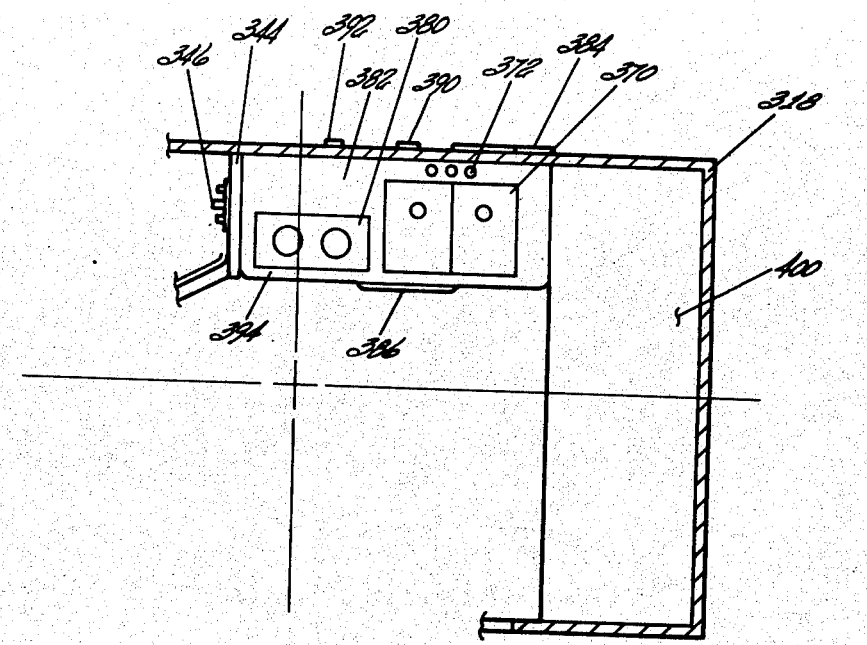
FIG. 10 is a partial top plan view showing an alternate arrangement of the floor plan illustrated in FIG. 9.

FIG. 10 shows an alternate arrangement of the forward portion of the trailer. If desired, a sink 370 having faucet 372 is located along the side of the self-contained towable facility which is in alignment with the interior wall 344 which supports the shower head and shower faucets 346. A cooking top 380 is located in the counter 382 which supports the sink 370. A water heater is located under the sink 370 and has a vent 384 for the water heater. A heater 386 can likewise be located under the counter 380 and a vent 390 is provided for the heater. A filling spout 392 is provided to fill a potable water tank 394 located underneath the counter 382 below the cook top 380. The front storage area 400 is located in the forward portion of the self-contained towable facility and can be used for storage or sleeping.

Figure 11:
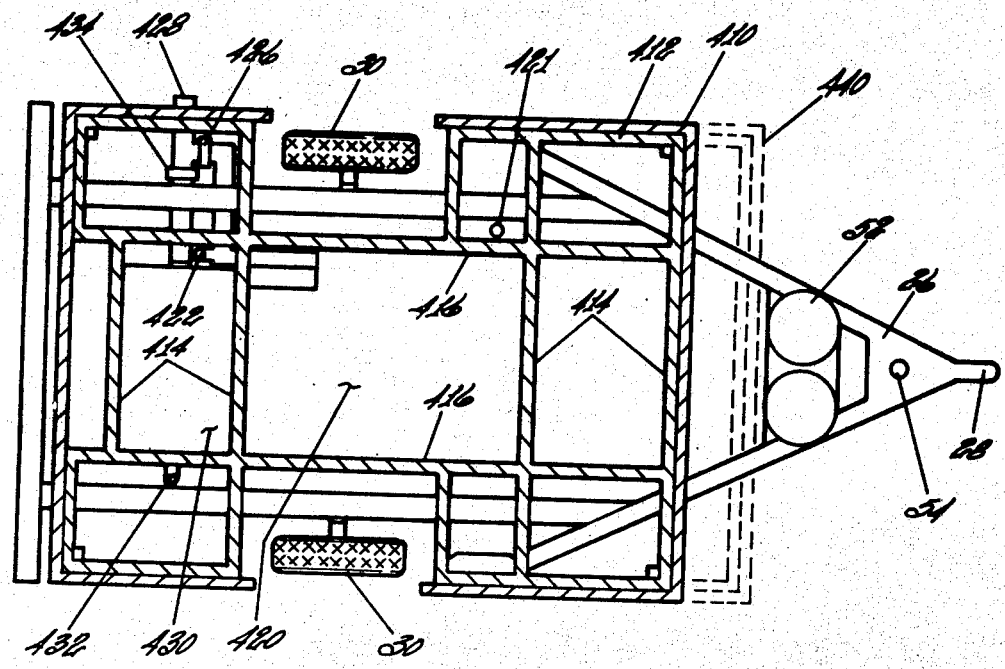
FIG. 11 is a top plan view of another embodiment of a rigid frame adapted for use with the floor plan arrangement illustrated in FIGS. 9 and 10.

FIG. 11 illustrates the frame and the various components which define the drain and waste water collection and isolation systems associated with FIGS. 9 and 10. The lower frame member 26, the coupling member 28, the gas tanks 52 and the tongue jack 54 are of the same construction as described in connection with the earlier embodiments of FIGS. 1 through 10, inclusive. An exterior wall 410 defines the lower section of the bottom of the self-contained towable facility. The upper frame section 412 has a plurality of cross members shown as 414 in a plurality of longitudinal support members shown as 416. A grey water holding tank 420 is located in the central area of the upper frame 412 and located between the wheels 30. A drain 422 is provided to collect drain water form the shower illustrated in FIG. 9. A drain 421 is provided to collect drain water from the sink illustrated in FIG. 9. A grey water drain valve 426 provides a method for removing water from the grey water holding tank 420 through an outlet 428.

A black water holding tank 430 is located rearward of the trailer and rearward of the grey water holding tank 420. The black water holding tank 430 includes an inlet 432 which is adapted to receive waste water from the toilet 356 illustrated in FIG. 9. A black water drain valve 434 is provided to remove the waste water within the black water holding tank 430 through outlet 428.

In the event that an extending front section is provided for the self-contained towable facility, illustrated in FIG. 10, the dimensions of the extending forward section are shown by dashed lines 440.

From a utility standpoint, in one embodiment, the overall length of the self-contained towable facility of FIGS. 9, 10, and 11, as measured from the end of the rear bumper to the tip of the tongue hitch and ball coupler, is one hundred seventy-two inches (172"). The main body length excluding spare tire, rear bumper, A-frame section 26, fifth wheel supported by the extending forward section or exterior hardware is approximately one hundred twelve inches (112") for FIG. 9 and one hundred twenty-four inches (124") for FIG. 10. If an extending forward section is added, as shown in FIG. 4, the overall length is increased to approximately two hundred inches (200") for FIG. 9 and two hundred twelve inches (212") for FIG. 10. In the embodiment illustrated in FIGS. 9, 10, and 11, the body width, minus the exterior side hardware, would be approximately eighty-two inches (82").

Vertical dimensions are similar to those listed for FIGS. 6 and 7.

Standard construction materials result in an overall trailer dry weight of approxiately one thousand one hundred eighty (1,180) pounds for FIG. 9 and one thousand two hundred (1,200) pounds for FIG. 10. In such configurations, the weight could vary plus five percent (5%) or minus ten percent (10%). The tongue force on a towing vehicle for an unloaded towable facility of FIGS. 9 or 10 can be selected to be between approximately two hundred three (203) pounds of force and about one hundred seventy-five (175) pounds of force plus five percent (5%) or minus fifteen percent (15%).

In a typical configuration where the towable facility is loaded with water and necessary supplies, the weight is increased approximately four hundred twenty (420) pounds, making the estimated loaded weight of the towable facility to be approximately one thousand six hundred (1,600) pounds for FIG. 9 and one thousand six hundred twenty (1,620) pounds for FIG. 10. The tongue force in a loaded condition remains approximately the same as for a dry condition. The gross weight capability of the self-contained towable facility of FIGS. 9 or 10 would be approximately two thousand six hundred (2,600) pounds. The maximum roll imbalance over either wheel under all loading conditions would be approximately fifty-six (56) pounds plus five percent (5%) or minus fifteen percent (15%).

Figure 12:
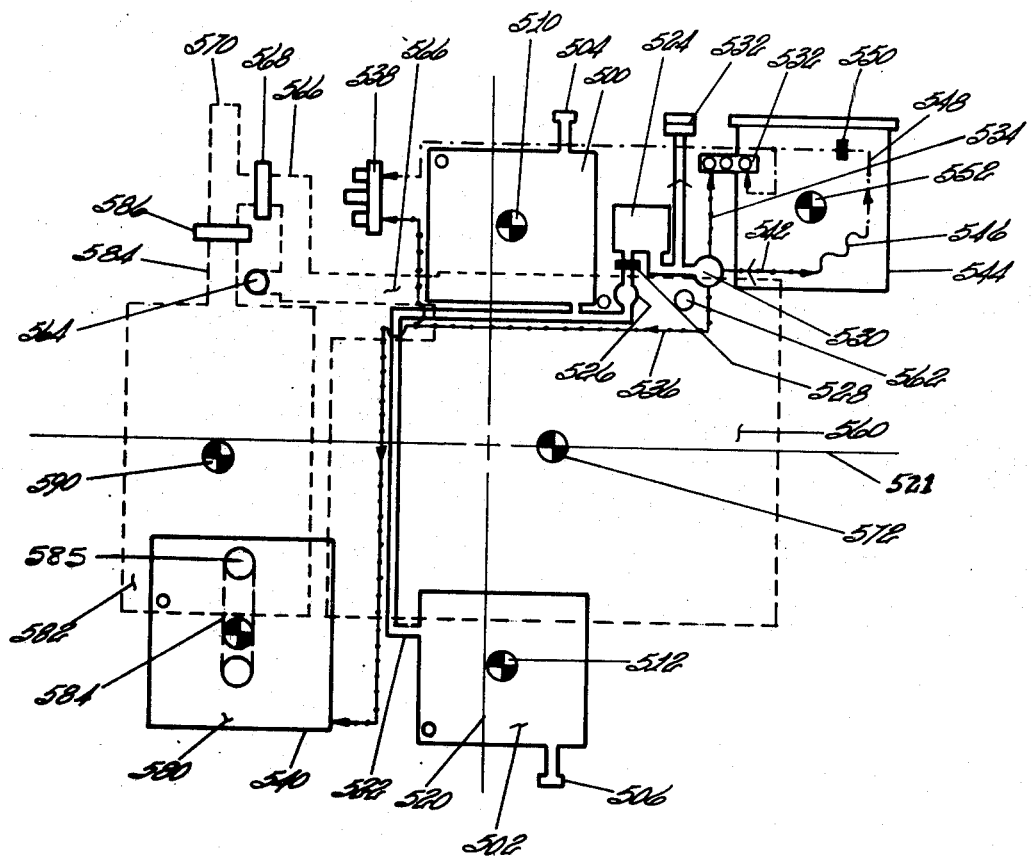
FIG. 12 is a top schematic view showing the various components defining the potable water storage system, the grey water collection system, the black water isolation system and the grey water and black water usage devices and the piping, valves and other components which mechanically connect the same into the operative, balanced system for a self-contained facility illustrated in FIGS. 6 and 7.

FIG. 12 is a schematic diagram which illustrates the various components of the self-contained towable facility showing the multiple-stage potable water storage and drain and waste water collection isolation systems which are adapted for use with the embodiments of FIGS. 1 through 11, inclusive. The potable water storage system includes potable water storage tanks 500 and 502 which include means adapted to fill the potable holding tanks exterior of the facility as shown by water fill spout 504 for potable water storage tank 500 and water fill spout 506 for potable water storage tank 502. The potable water storage tanks 500 ad 502 are adapted to be attached to the frame and are positioned approximately over the axle. The potable water storage tanks 500 and 502 have a geometrical shape to enable the center of gravity thereof to remain located at approximately the centerline of the axle in a two-wheeled application and at approximately the midway point between the lateral centerlines of the forward and rear wheels in a four-wheel application independent of the volume of potable water stored in the potable water system and the amount of potable water withdrawn therefrom. The volume of water within each of the potable water storage tanks 500 and 502 is maintained at the same level by interconnecting the two (2) tanks by interconnecting means such as conduit 522. Thus, as water is used within the self-contained towable facility, each of the potable water tanks 500 and 502 have their volume used equally thereby maintaining their collective center of gravity over the longitudinal axis of the trailer represented as dashed line 521.

Conduit 522, which goes from potable water storage tanks 500 and 502, is connected to a pump 524. A filter 526 is connected between the conduit 522 and the pump 524. A drain valve 528 is provided to permit removal of water from the potable water tanks 500 and 502. The pump 524 which is driven by the electrical system has an accumulator 530 to accumulate water pumped from the pump 524. In the alternative, a pressure regulator and entry valve 532 is provided to enable the towable facility to be connected to a pressurized external source of water such as a city water entry. Water from the accumulator 530 is then supplied to a faucet 532 of a sink located in the forward section of the trailer, by a cold water line 534 and is connected by a cold water line to 536 to both the shower 538 and to a fresh water flushing type toilet 540. Also, cold water from the accumulator 530 is supplied via piping 542 to a water heater 544 having a heat exchanger shown as element 546. The hot water is carried by piping represented by dashed lines 548 through a drain valve 550 to the hot water input of a faucet 532 and to the hot water input of shower faucet 538. The center of gravity shown by circle section 552 of heater 544 is located forward of the centerline 520.

During the usage of water, the sink faucet 532 and the shower 538 produce drain water having a low impurity level. The drain water from the sink faucet 532 is collected in a grey water holding tank 560 through an inlet 562. Also, the grey water from the holding tank 560 can be drained therefrom by means of piping shown by dashed lines 566 to a grey water drain valve 568 and out through outlets shown by dashed area 570. The center of gravity of the grey water holding tank 560 is shown by circle sector 572. During collection of the grey water and independent of the volume of grey water collected within the grey water holding tank 560, the center of gravity thereof remains at an approximate location shown by circle sector 572.

During usage, a toilet 580, which in the embodiment of FIG. 12 is a combination recirculating and fresh water flushing type of toilet, produces waste water having a high impurity level. The waste water having a high impurity level is collected within the black water holding tank 582 through drain 585. The black water holding tank 582 can be drained through piping shown by dashed lines 584 through a black drain valve 586 and through outlet 570. The center of gravity of the black water holding tank 582 is shown by circle sector 590. The center of gravity of the black water holding system as shown by circle sector 590 is located rearward of the grey water holding tank 560 and rearward of the centerline 520 relative to the grey water holding tank 560. The black water holding tank 582 during usage collects the waste water and maintains a center of gravity thereof at an approximate location shown by circle sector 590.

Figure 13:
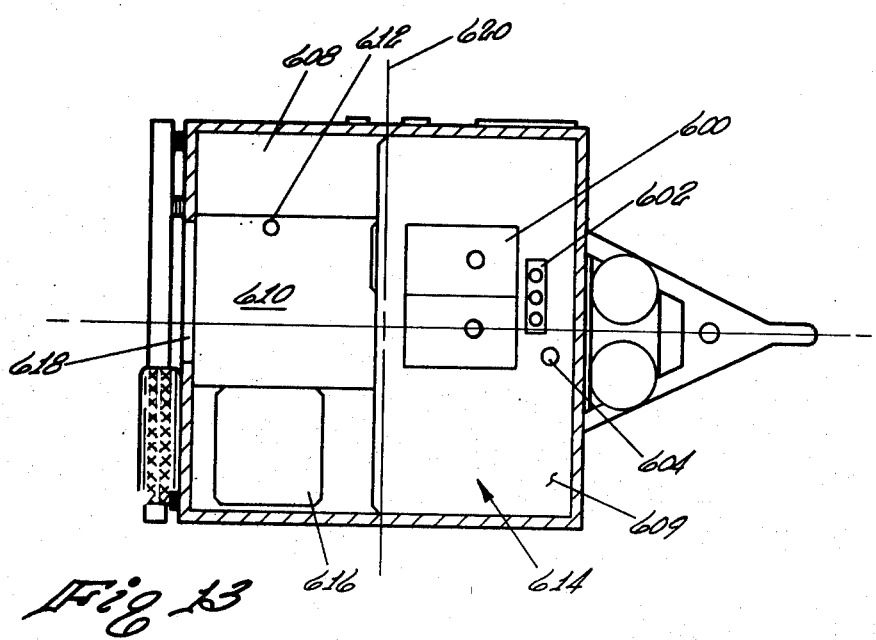
FIG. 13 is a top plan view of a self-contained, compact towable facility showing in a floor plan yet another embodiment which illustrates the locations of the various components therein for a compact towable facility which is smaller in size and weight than that of FIG. 6.

FIG. 13 shows another embodiment of a compact self-contained towing facility using the teachings of this invention. The difference between the construction of FIG. 13 and that of FIG. 6 is that the overall size of the self-contained towing facility is substantially reduced. In FIG. 13, the sink 600 and its associated faucet 602 are located at the forward end of the towable facility. In addition, a hand held shower head wand 604 can be used as both a rinsing device for the sink 600 or, in the alternative, as a shower head adapted to be used by a user standing in area 610 within the interior of the towable facility. Potable water tanks 608 and 609 are located one forward and one rearward of the lateral centerline 620 of the wheels 30. A shower drain 612 is provided to collect and remove drain water from the shower. The electrical system shown generally as 614 can be located under the counter which supports the sink 600, faucet 602 and shower 604. A toilet 616 is likewise provided within the towable facility and is accessible from the shower/floor area 610. A door 618 is provided at the rear of the trailer to provide access to the shower/floor area 610.

Figure 14:
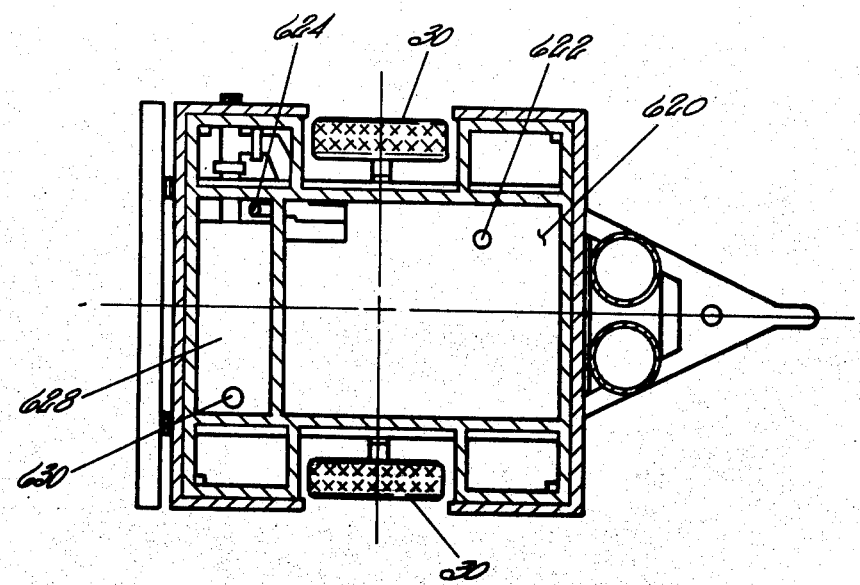
FIG. 14 is a top view of a rigid frame adapted to be used in the floor plan illustrated in FIG. 13.

FIG. 14 illustrates the frame and multi-stage potable water storage system and drain and waste water collection and isolation systems for the embodiment illustrated in FIG. 13. The grey water holding tank 620 is located between the wheels 30 of the towable facility. A drain 622 is provided to collect the drain water from the sink 600 illustrated in FIG. 13. A drain 624 is provided to collect drain water from the use of the shower head wand 604 in the area 610 which is collected by a drain 612 in FIG. 13. As described in connection with FIG. 13, the potable water storage tank shown by 608 in FIG. 13 is positioned in substantially the same area as and above the drain 624.

A black water holding tank 628 is located rearward of the grey water holding tank 620. The inlet 630 from the toilet 616 in FIG. 13 collects waste water therefrom for depositing of the same into the black water holding tank 628.

From a utility standpoint, in one embodiment, the overall length of a self-contained towable facility of FIGS. 13 and 14, as measured from the end of the rear bumper to the tip of the tongue hitch and ball coupler, is one hundred twenty inches (120"). The main body length excluding spare tire, rear bumper, A-frame section 26, fifth wheel supported by extending forward section or exterior hardware is approximately seventy-two inches (72"). If an extending forward section is added, as shown in FIG. 4, the overall length is increased to approximately one hundred sixty inches (160"). In the embodiment illustrated in FIGS. 13 and 14, the body width, minus exterior side hardware, would be approximately sixty-eight inches (68").

Depending on the configuration of the housing, namely whether the towable facility has a fixed bottom section and a telescoping top section or has a fixed housing, the collapsed total height of a telescoping section above ground can vary between forty-nine inches (49") to seventy-two inches (72") when in the collapsed position and ninety-eight inches (98") when in an erected condition with a telescoping top in the open position or in a fixed exterior housing configuration. The interior head room within the trailer can be in the order of seventy-six inches (76").

Standard construction materials result in an overall trailer dry weight of approximately eight hundred eighty-five (885) pounds. In such a configuration, the weight could vary plus five percent (5%) or minus ten percent (10%). The tongue force on a towing vehicle for an unloaded towable facility of FIG. 13 can be selected to be between approximately one hundred fifteen (115) pounds of force and one hundred (100) pounds of force plus five percent (5%) or minus fifteen percent (15%).

In a typical configuration where the towable facility is loaded with water and necessary supplies, the weight is increased approximately four hundred fifteen (415) pounds, making the estimated loaded weight of the towable facility to be approximately one thousand three hundred (1,300) pounds. The tongue force in a loaded condition can be selected to be between approximately one hundred forty-four (144) pounds of force and one hundred twenty (120) pounds of force plus five percent (5%) or minus fifteen percent (15%). The gross weight capability of the self-contained towable facility of FIG. 13 would be approximately two thousand (2,000) pounds. The maximum roll imbalance over either wheel under all loading conditions would be approximately thirty-six (36) pounds plus five percent (5%) or minus fifteen percent (15%).

Figure 15:
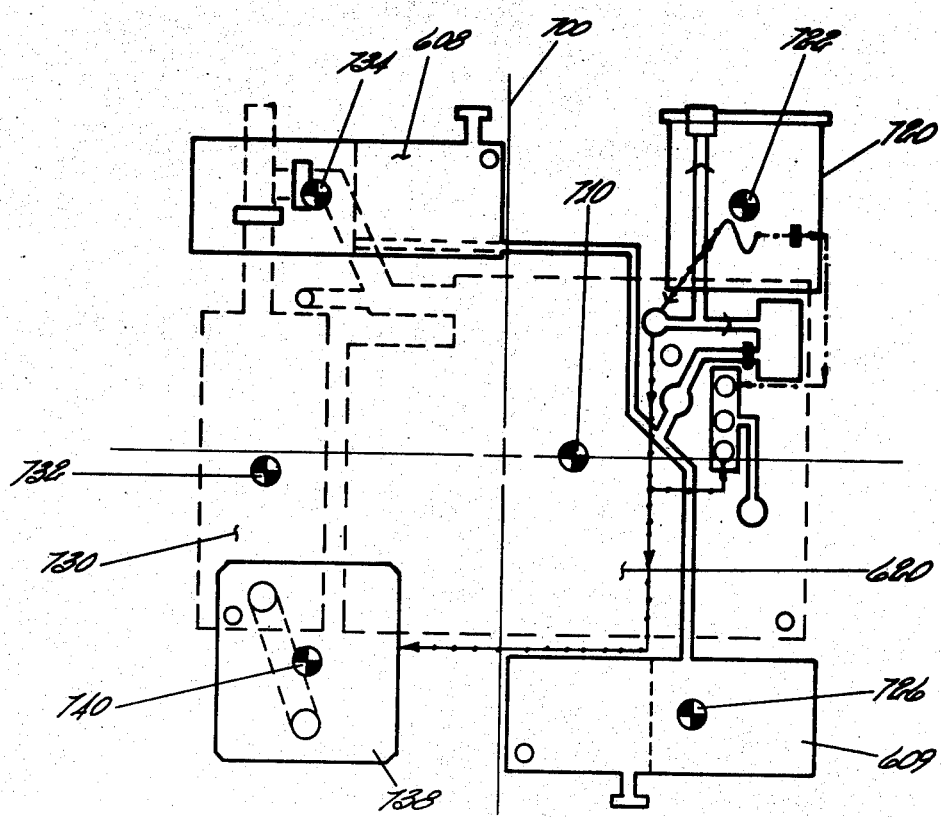
FIG. 15 is a top schematic view showing various components defining the potable water storage system, the grey water collection system, the black water isolation system and the grey water and black water usage devices and the piping, valves and other components which mechancially connect the same into operative balance systems of FIGS. 13 and 14 and is a variation of FIG. 12.

The schematic diagram of FIG. 15 illustrates the multistage potable water storage and drain and waste water collection and isolation systems for the embodiment described in connection with FIGS. 13 and 14. The major differences between the schematic diagram of FIG. 15 and that illustrated in FIG. 12 is the fact that the potable water storage tank 608 and potable water storage tank 609 are located one each rearward of the centerline 700 and the other forward of the centerline 700. The center of gravity of the grey water holding tank 620 is shown by circle sector 710. The center of gravity of the grey water holding tank 620 is located slightly forward of the centerline 700.

The water heater 720 has a center of gravity shown by circle sector 722 which is located forward of the centerline 700. Potable water tank 609 has a center of gravity shown by circle sector 726 which is located forward of the centerline 700 and forward of circle sector 710 which is the center of gravity of the grey water holding tank 620.

The black water holding tank 730 has a center of gravity shown by circle sector 732 which is located rearward of the centerline 700. Likewise, the center of gravity of potable tank 608 shown by circle sector 734 is located rearward of the centerline 700. Also, the centerline of the toilet 738 is shown to have a center of gravity shown by circle sector 740 which is located rearward of the grey water holding tank 620.

As is apparent from the descriptive locations of the various centers of gravity as shown by circle sectors 710, 722 and 726 which are forward of centerline 700 and a center of gravity shown by circle sectors 732, 734 and 740 which are rearward of the centerline 700 provide a self-contained towable facility which has a total, collective center of gravity of the multistage potable water storage and drain and waste water collection and isolation systems which remains substantially constant independent of the volume of water stored in any particular tank or the volume of water which is transferred therebetween.

FIGS. 16, 17, 18 and 22 disclose an alternate embodiment of the self-contained, compact towable facility of FIG. 1 in a four wheeled configuration.

The fixed bottom portion 40' would be modified to accomodate a pair of rear wheels 750 which may be independently mounted at a predetermined distance from the centerline of the rigid frame in a direction opposite to that portion of the rigid frame attached to the towing vehicle by a mounting means. The rear wheels 750 are mounted at a predetermined distance relative to the lateral centerline of the rigid frame. Similarly, the front section of the fixed bottom portion 40' would likewise be modified to accomodate steerable front wheels 760. The front wheels 760 may be independently pivotally mounted or be part of a steerable front wheel assembly 762 through a mounting means. The second set of wheels are mounted at a predetermined distance from the centerline of the rigid frame in a direction towards that portion of the rigid frame attached to the towing vehicle.

In the embodiment illustrated in FIGS. 16, 17, 18 and 22, the front wheels 760 are mounted independently but are part of a steering assembly 762 controlled by the tow bar 26. The details of such assemblies are well known in the art and are not disclosed in detail herein. Similarly the embodiment of the steering assembly illustrated in FIGS. 16, 17, 18 and 22 is an integrated assembly in that the tow bar 26 performs the function of towing and steering. However, other steering assemblies may be utilized in the steerable four-wheeled embodiment wherein the tow bar is rigid to perform a towing function and a second steering bar extends from a selected location on the towing vehicle to the steerable front wheels of the four-wheeled trailer to support a steering motion and force to the steerable front end in response to turning of the towing vehicle.

The components in terms of liquid propane gas tanks and the like may have to be rearranged to accomodate the wheels. The maximized balanced water storage, drain water collections and waste water isolation system minimizes unbalancing moments which contributes to further minimizing variations of loading moment of the tow vehicle and increases the stability of the four-wheeled, self-contained, compact towable facility as described and disclosed by FIGS. 16, 17, 18 and 22.

Figure 19:
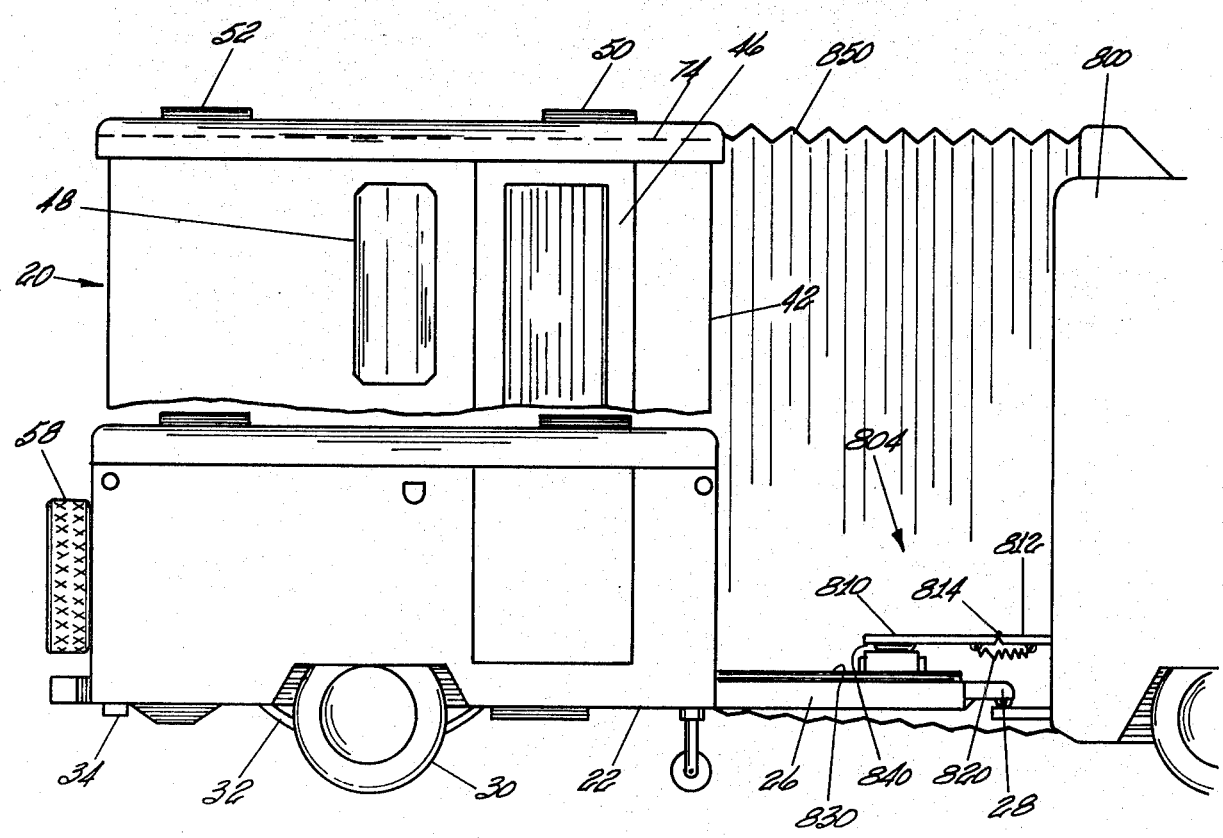
FIG. 19 is a front plan view of another embodiment of a self-contained, compact towable facility having over-the-tow-bar access from the towing vehcile.
Figure 20:
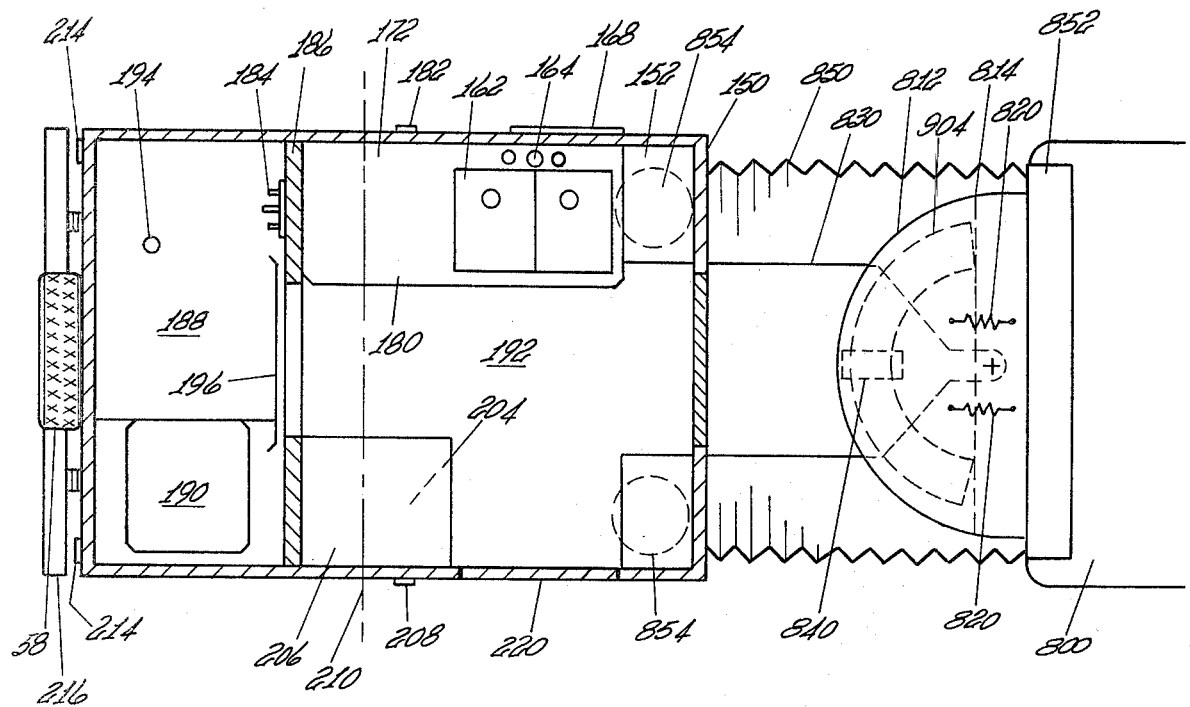
FIG. 20 is a top plan view showing a floor plan and the over-the-tow-bar access platform for the self-contained, compact towable facility for the embodiment of FIG. 19.
Figure 21:
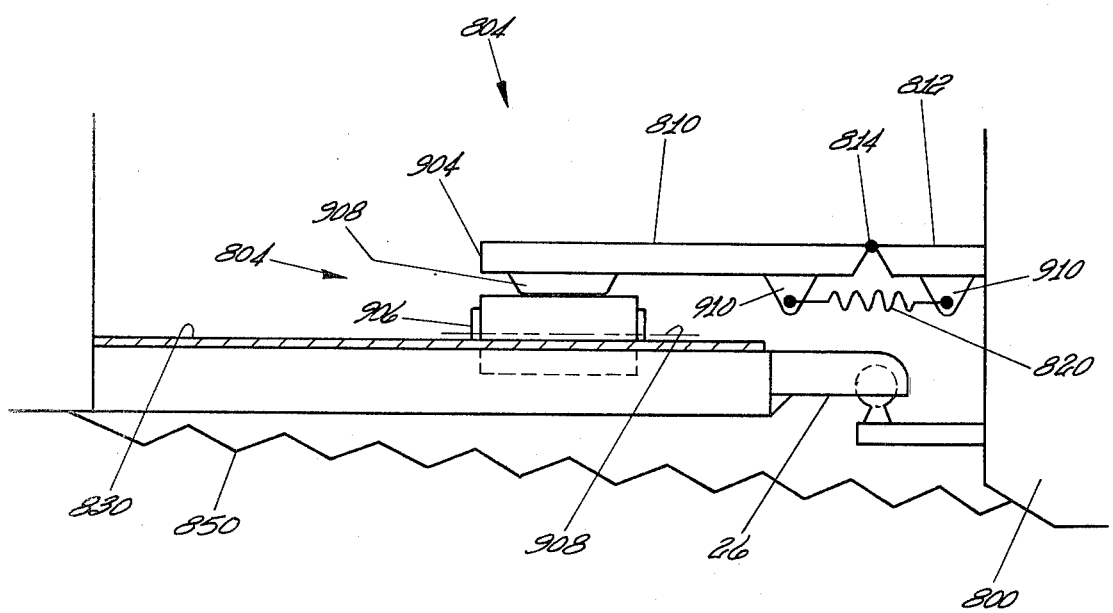
FIG. 21 is a pictorial representation of the over-the-tow-bar access platform and the structural relationship thereof to the towing vehicle.

FIGS. 19, 20 and 21 disclose another embodiment of the two-wheeled self-contained, compact towable facility which is a variation of FIG. 1 by providing over-the-tow-bar access from a towing vehicle 800 to the towable facility.

The towing vehicle 800 includes a moveable tow vehicle platform 804 having an outward section 810 and an inward section 812 pivotally mounted thereto through a pivot means 814. The other end of the inward section 812 is operatively mounted to the towing vehicle 800 to permit outward section 810 or the entire tow vehicle platform 804 to be lifted against the rear of the towing vehicle 800. A resilient member, such as springs 20 are utilized to apply a downward restoring force on the outward section 810 and around pivot means 814 to maintain contact between the outward section 810 and an acess platform-tow-bar member 830 through slip member 904 and roller 906 as shown in FIG. 21.

The tow bar 26 cooperates with the combination tow-bar-floor assembly 830 which provide an access platform to provide over-the-tow-bar 26 access to the towable facility 20. A motion translation assembly 840 provides a slideable support between the outward section 810 of the tow vehicle platform 804 and the combination floor-tow-bar assembly 830. The motion translation assembly 840 is disclosed in greater detail in FIG. 21.

A flexible enclosure or weather shroud 850 may be provided to cover the access area between the towing vehicle 800 and the towable facility 20.

As illustrated in FIG. 20, relocation of certain of the components, such as the liquid propane gas tanks 854, may be required. A weather shroud enclosure 852 may be mounted on the towing vehicle 800 as shown or on the towable facility 20 if desired.

FIG. 21 discloses one embodiment of the over-the-tow-bar access structure. End 904 of the outward section 810 of the motion translation assembly has a sector shaped slip member 904. The sector shaped slip member is illustrated by the dashed line 904 in FIG. 20 and is shown with the sector ends being directed towards the inward section 812. The sector shaped slip member 904 is formed of a tough, slipping material such as Teflon material. The slip member 904 is in slideable rotational engagement with the surface of a roller 906 having its centerline 908 positioned to support the roller 906 sufficiently above the surface of the combination access platform-tow-bar member 830. In the alternative, a roller bearing type of arrangement may be used in place of the sector shaped slip member 904 to interact with the cross-roller 906.

The springs 820 are mounted onto spring support housings 910 located on the underside of tow vehicle platform 804 and are each on the outward section 810 and inward section 812. The springs 820 have sufficient force to urge and hold the sector shaped slip member 904 against the surface of roller 906 in response to pitch, roll and yaw experienced by the towable facility 20 during towing thereof or turning and pitching of the towing vehicle.

Figure 16:
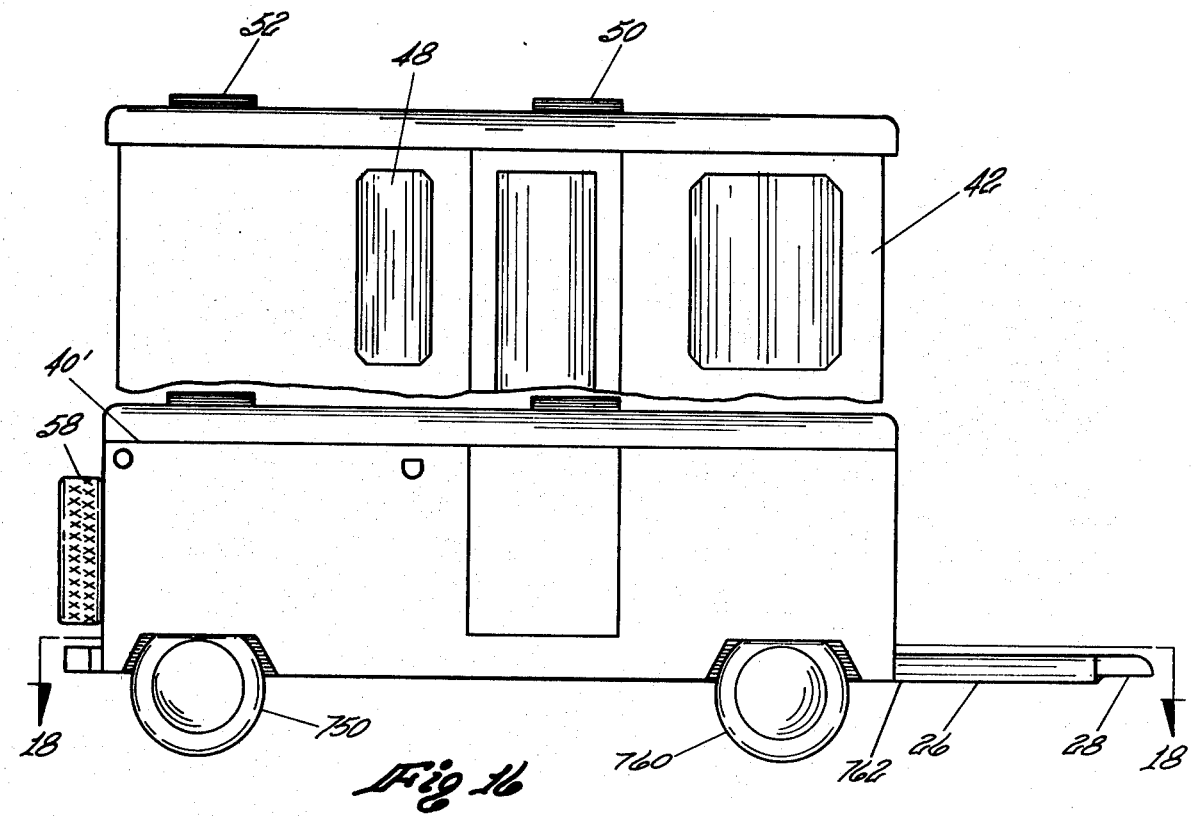
FIG. 16 is a front plan view of another embodiment of a self-contained, compact towable facility having four wheels with the two front wheels being steerable to enable the same to track the towing vehicle.
Figure 17:
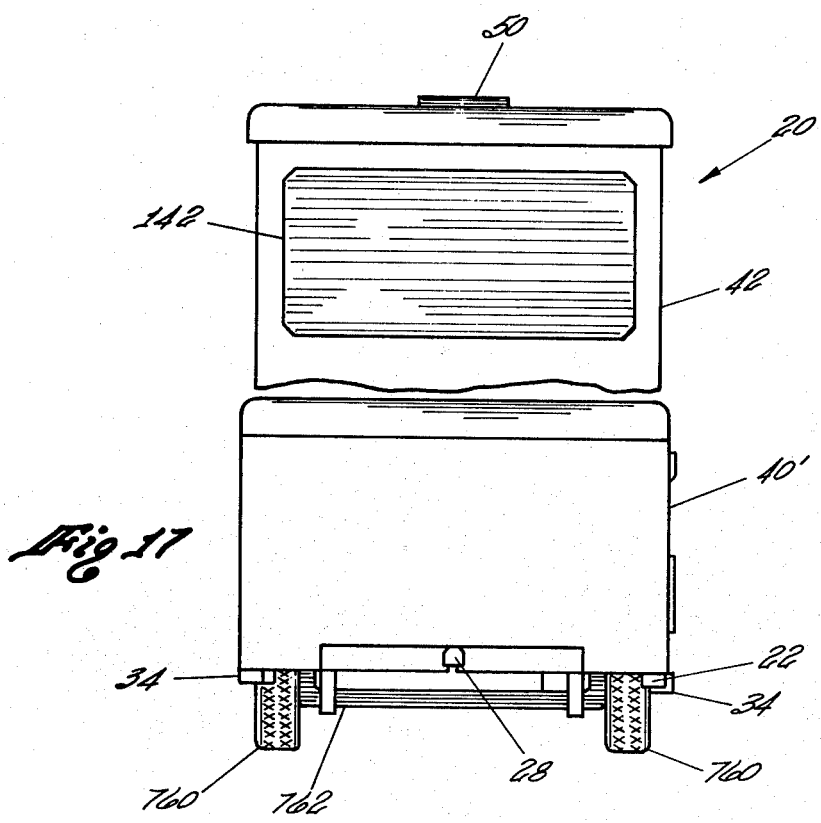
FIG. 17 is a right end plan view of the self-contained, compact towable facility of FIG. 16 showing the use of a single towing and steering member.
Figure 18:
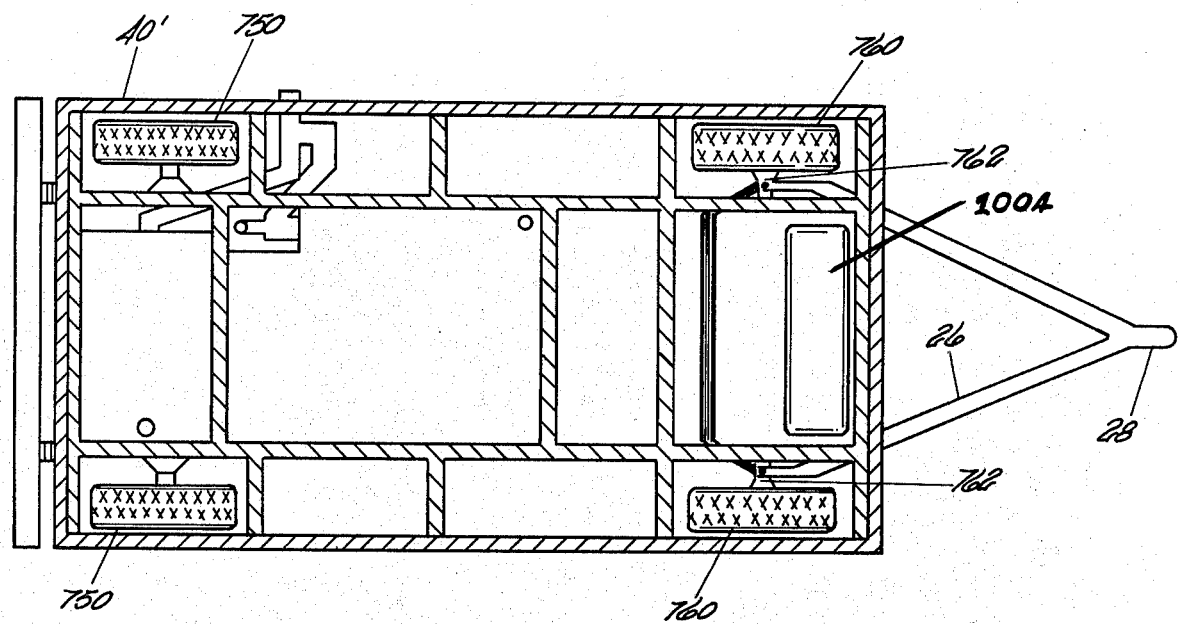
FIG. 18 is a top plan view of a rigid frame adapted for use with a four wheel self-contained compact towable facility of FIG. 16.
Figure 22:
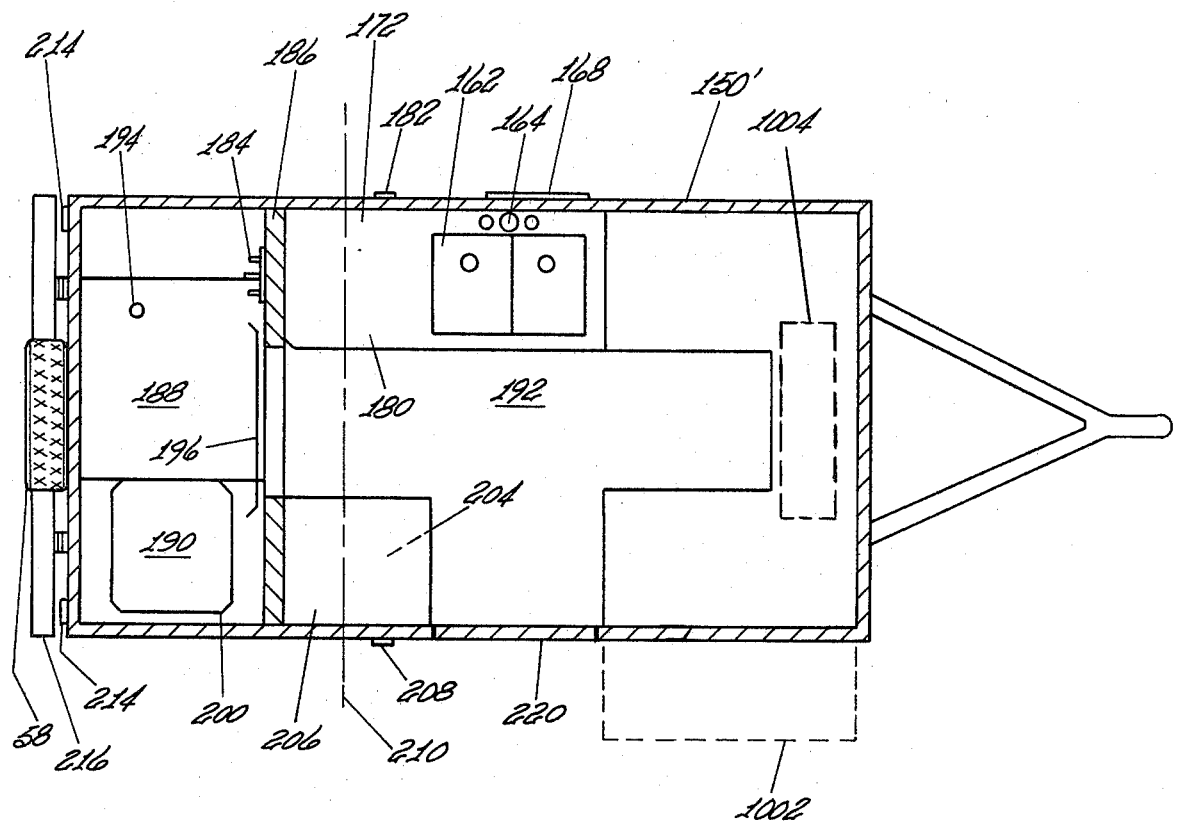
FIG. 22 is a floor plan wherein wheel wells are provided for the four-wheeled compact towable facility as shown in FIGS. 16, 17 and 18 and an extendable section is provided over the wheel wells to accommodate adult length for sleeping purposes, if desired.

FIG. 22 illustrates an embodiment of the self-contained, compact towable facility of FIG. 16 wherein the enclosed housing is modified to include an extendable section 1002 of sufficient dimension to accomodate the length of one or two adults laying down in a direction substantially parallel to the lateral center line of the rigid frame. The liquid propane gas tank 1004 must be relocated and the bottom section 150' must likewise be reconstructed.

As is readily apparent, the embodiments of self-contained, compact towable facility may be utilized in a wide variety of trailer structures wherein the maximized balanced potable water storage, drain water collection and waste water isolation system permit the incorporation of a multistage potable water storage and drain and waste water collection and isolation system into the design of the trailer or towable facility.

In connection with the various embodiments of a self-contained towable facility as described in connection with FIGS. 1 through 22, it is readily apparent that a wide range of floor plans, sizes and constructions are possible using the teachings of the present invention. The important design criteria which has been taken into account in describing the embodiments disclosed herein is that the weight and balance range under all loading conditions can be optimized for lightweight materials, detailed stress analysis, and reduction in component weights, such as size and weight of water heaters, furnaces, batteries and the like, to reduce ultimate dry and loaded weight of the towable facility. In use, and depending on the floor plan, size of the trailer and other selectable elements, the weight and balance of the towable facility can be precisely controlled by the positioning of the components so that the facility weight and resulting tongue force applied on the towing vehicle can be precisely controlled by the position of the centers of gravity about the centerline of the trailer.

What is claimed is:

1. A compact self-contained towable facility including sanitation components and electrical, gas and water distribution systems therefor, and having a minimum size and weight while maximizing the volume of water carried thereby comprising a rigid frame;

means operatively connected to said rigid frame for coupling the rigid frame to a towing vehicle;

means for mounting a plurality of wheels on said rigid frame at preselected distances relative to the lateral centerline of the rigid frame;

a multistage potable water storage and drain and waste water collection and isolation system including a potable water storage system having a predetermined volume and operatively attached to the frame and formed into a geometrical shape to enable the collective center of gravity thereof to be located at approximately the centerline of the axle independent of the volume of potable water stored in the potable water system and the amount of potable water withdrawn therefrom;

a grey water collection system having a predetermined volume and adapted to receive and collect drain water having a low impurity content, said grey water collection system being operatively coupled to said frame between the wheels of said axle and positioned under said potable water storage system;

a black water isolation system having a predetermined volume and adapted to receive and isolate waste water having a high impurity content, said black water isolation system being operatively coupled to aid frame and adjacent to the grey water collection system; and water system distribution means operatively coupled to said multistage potable water storage and drain and waste water collection and isolation system which permits water to be removed from the potable water storage system and to be transferred into at least one of the grey water collection system and the black water collection system wherein the withdrawal and passage of water therebetween results in the collective center of gravity of the potable water systems, grey water collection system and black water collection system remaining substantially at the same location relative to the centerline of said rigid frame to enable the towable facility to maintain the variations of force applied by the connecting means for coupling said rigid frame to a towing vehicle over a selected limited force range.

2. The compact self-contained towable facility of claim 1 wherein said means for mounting a plurality of wheels from said frame includes a first set of wheels rotatably mounted on said rigid frame at a predetermined distance from the center line of said rigid frame in a direction opposite to that portion of the rigid frame adapted to be attached to a said towing vehicle;

a second set of wheels rotatably mounted on and being steerable relative to said rigid frame at a predetermined distance from the centerline of said rigid frame in a direction towards that portion of the rigid frame adapted to be attached to a said towing vehicle; and means including a steering assembly operatively coupled to the second set of wheels and responsive to the turning movements of a said towing vehicle to steer the same in the direction of turn of a said towing vehicle to cause the towable facility to track a said towing vehicle.

3. The compact self-contained towable facility of claim 2 wherein said second set of wheels are independently supported and are adapted to be steered by the steering assembly in a selected direction.

4. The compact self-contained towable facility of claim 1 further comprising an extension housing adapted to enclose the rigid frame and including an extendable section which is located between the lateral centerline of the rigid frame and the tow bar wherein the extendable section extends in a direction substantially parallel to the lateral centerline to provide an extended area of sufficient size to accomodate an adult laying down in a direction substantially parallel to said lateral centerline.

5. The compact self-contained towable facility of claim 1 further comprising an access platform rigidly affixed to the tow bar to provide over-the-tow-bar access from a said towing vehicle to the towable facility.

6. The compact self-contained towing facility of claim 5 adapted for use with a towing vehicle comprising, in combination, a tow vehicle platform assembly having an inward section and an outward section, said inward section having one ene thereof moveably attached to a said towing vehicle and the other end thereof pivotally attached to one end of said outward section to permit said outward section to pivot about said inward section, said outward section end extending beyond a said towing vehicle to pass over and be spaced from said access platform;

a motion translation assembly mounted between said end of the outward section of the tow vehicle platform and said access platform to provide a slideable, moveable support therebetween; and resilient means operatively coupled between the pivotally joined ends of the inward section and outward section, said resilient means being adapted to apply a restoring force on said outward section to cause the end thereof to be in continual sliding engagement with the motion translation assembly.

7. The compact self-contained towable facility of claim 6 wherein said motion translating assembly includes sector shaped slip member mounted onto the end of the outward section and on the side thereof towards the access platform with the section ends directed towards the inward section; and a cross-roller rotatably mounted below the sector shaped slip member and positioned with the centerline thereof substantially normal to the lateral centerline of said rigid frame, said cross-roller having its surface in slideable rotatable engagement with said sector shaped slip member to permit relative motion therebetween to accomodate pitch, roll and yaw of the towable facility and turning and pitching of a said towing vehicle.

8. The compact self-contained towable facility of claim 7 wherein said resilient means are damped springs.

9. The compact self-contained towable facility of claim 7 wherein said sector shaped slip member is formed of Teflon material.

10. The compact self-contained towable facility of claim 6 further comprising a flexible enclosure operatively coupled to at lease one of said towable facility and a said towing vehicle, said flexible enclosure being extendable across the access platform and tow vehicle platform.

11. The compact self-contained towable facility of claim 1 wherein said facility has two grey water usage devices comprising a sink; and a shower.

12. The compact self-contained towable facility of claim 1 wherein said black water usage devices is a recirculating device which recirculates the waste water during usage thereof.

13. The compact self-contained towable facility of claim 1 wherein said black water usage device is a fresh water flushing device.

14. The compact self-contained towable facility of claim 1 further comprising a water heater operatively coupled to the potable water storage system and said at least one grey water usage device.

15. The compact self-contained towable facility of claim 1 further comprising an electrical system including a battery, battery charger, converter and electrical devices operatively coupled to said electrical system.

16. The compact self-contained towable facility of claim 1 further comprising a gas system including a gas device operatively coupled to said gas system; and a gas storage tank operatively coupled to the gas system for supplying a source of gas.

17. The compact self-contained towable facility of claim 1 further comprising an interior heater.

18. The compact self-contained towable facility of claim 1 further comprising an exterior housing adapted to enclose the frame, grey water usage device, black water usage device, electrical system and gas distribution system.

19. The compact self-contained towable facility of claim 18 wherein said exterior housing has a fixed bottom section and a telescoping top section.

20. The compact self-contained towable facility of claim 1 wherein said connecting means is a tow-bar.

* * * * *